Nov. 14, 1967  G. BOULADON ET AL  3,352,250
TRANSPORT APPARATUS
Filed March 20, 1964  18 Sheets-Sheet 10
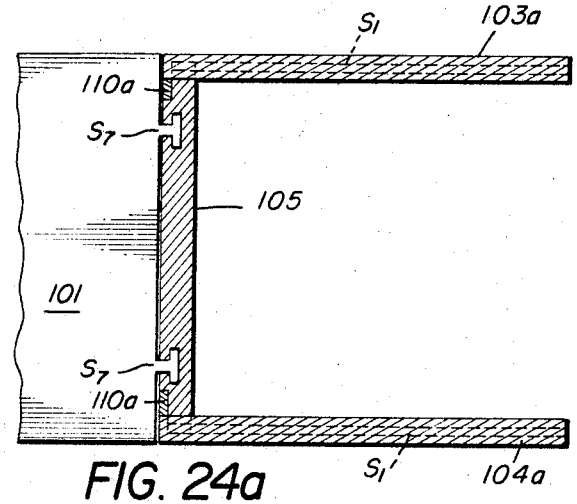
FIG. 24a
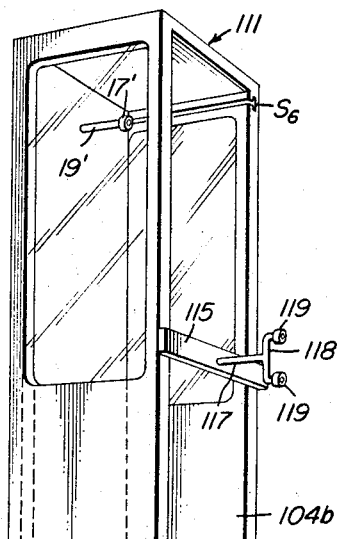
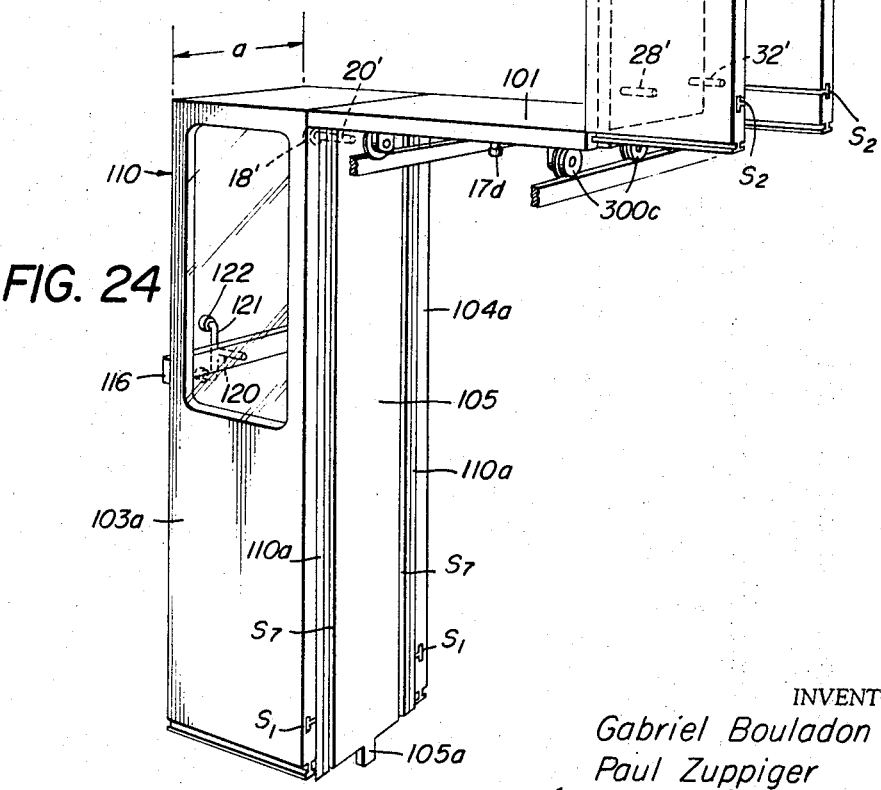
FIG. 24
INVENTORS
Gabriel Bouladon
Paul Zuppiger
BY John B. Summerant
ATTORNEY

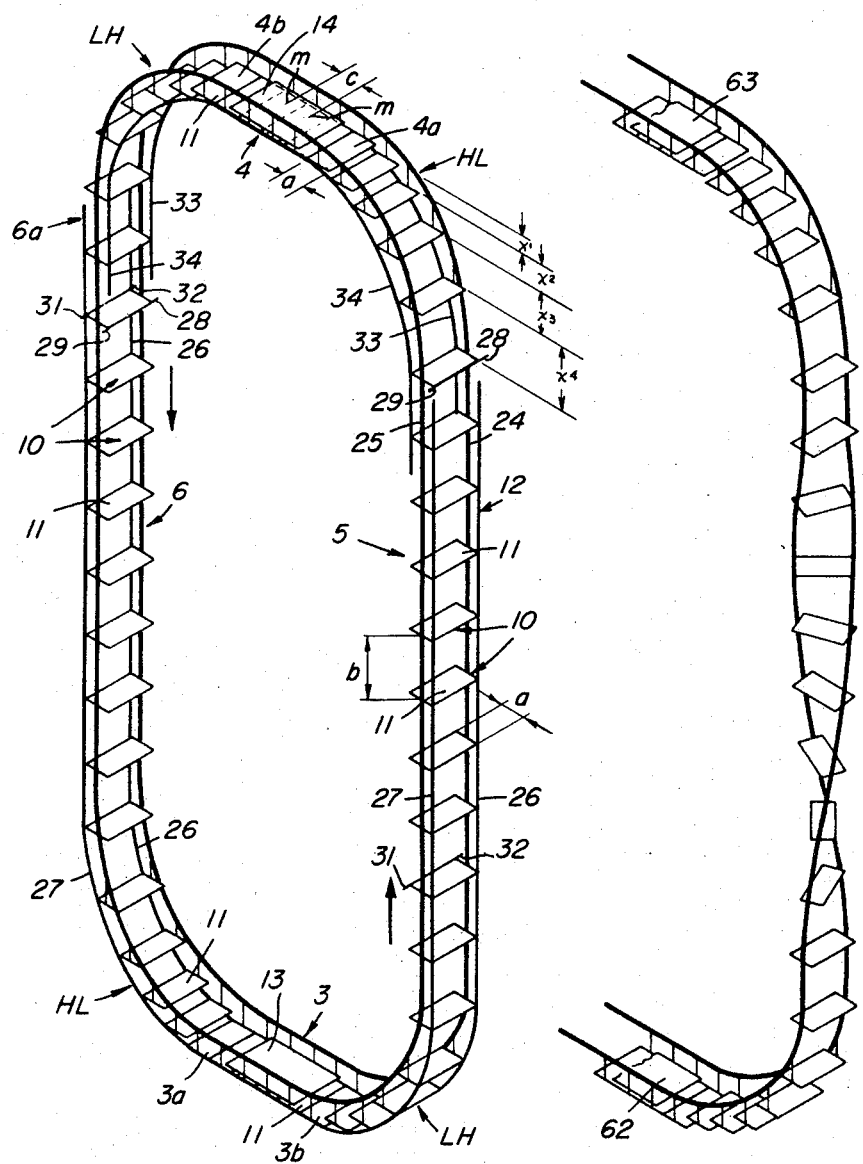

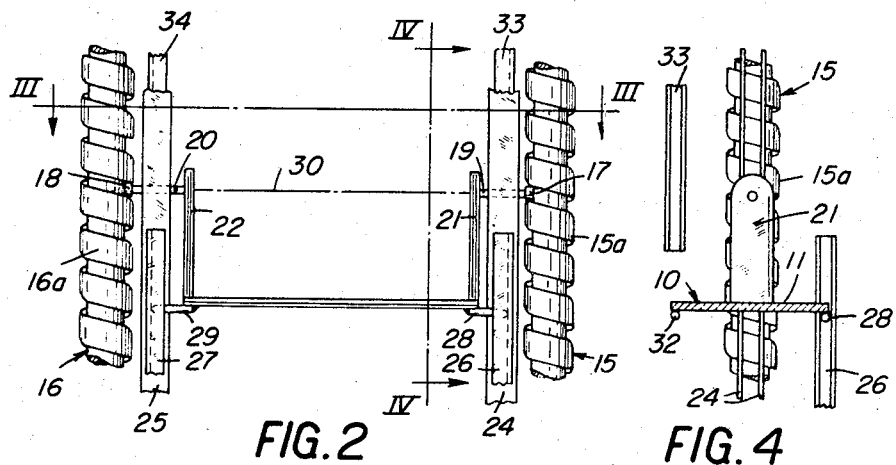
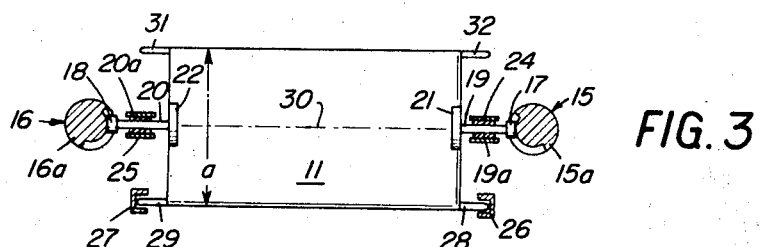
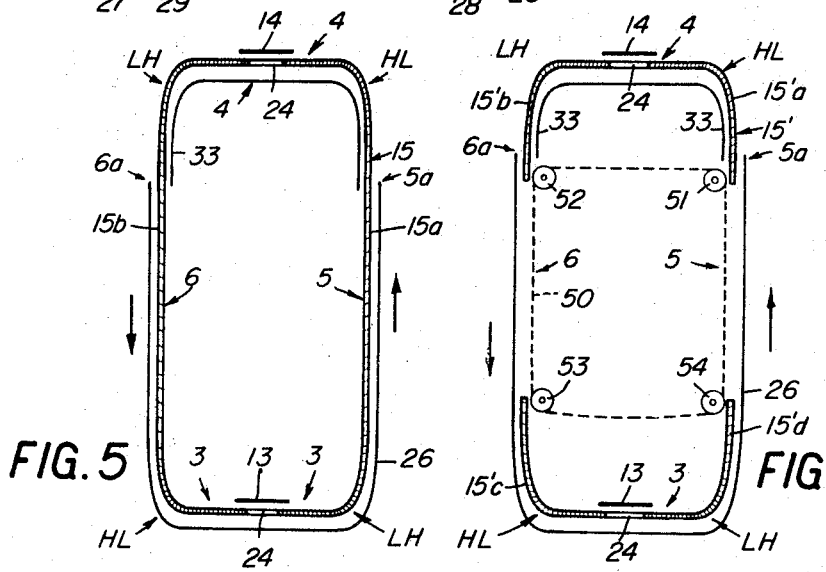

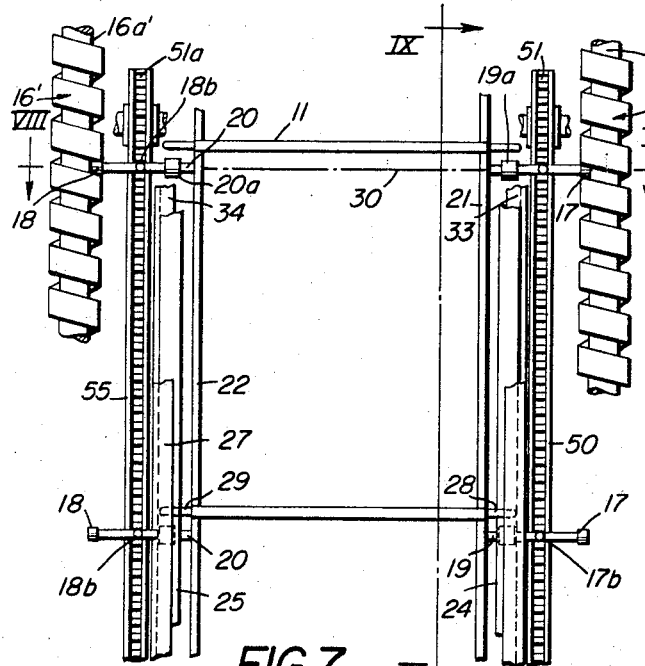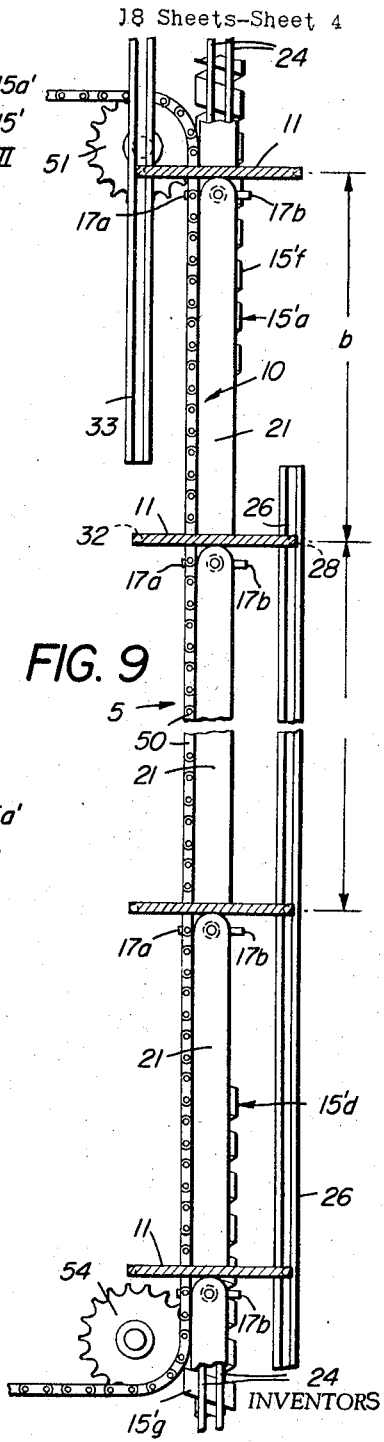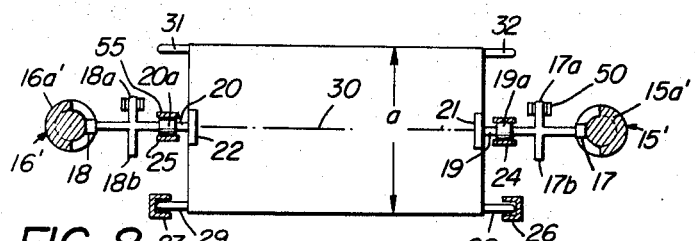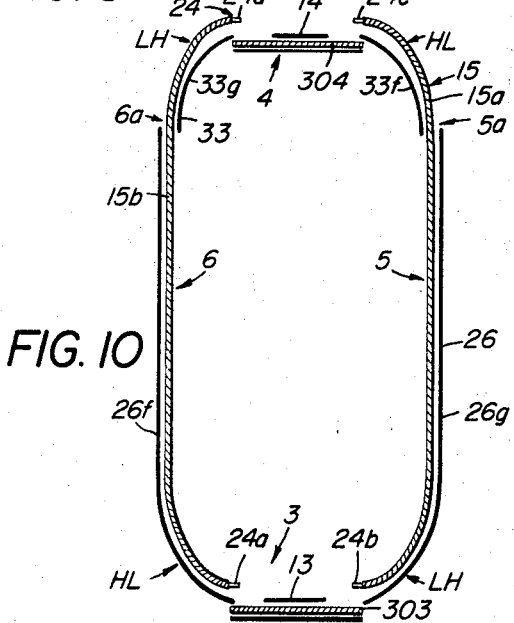

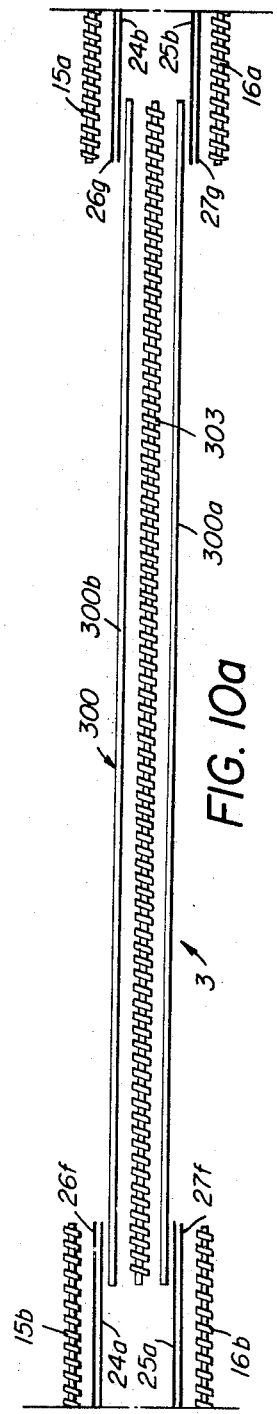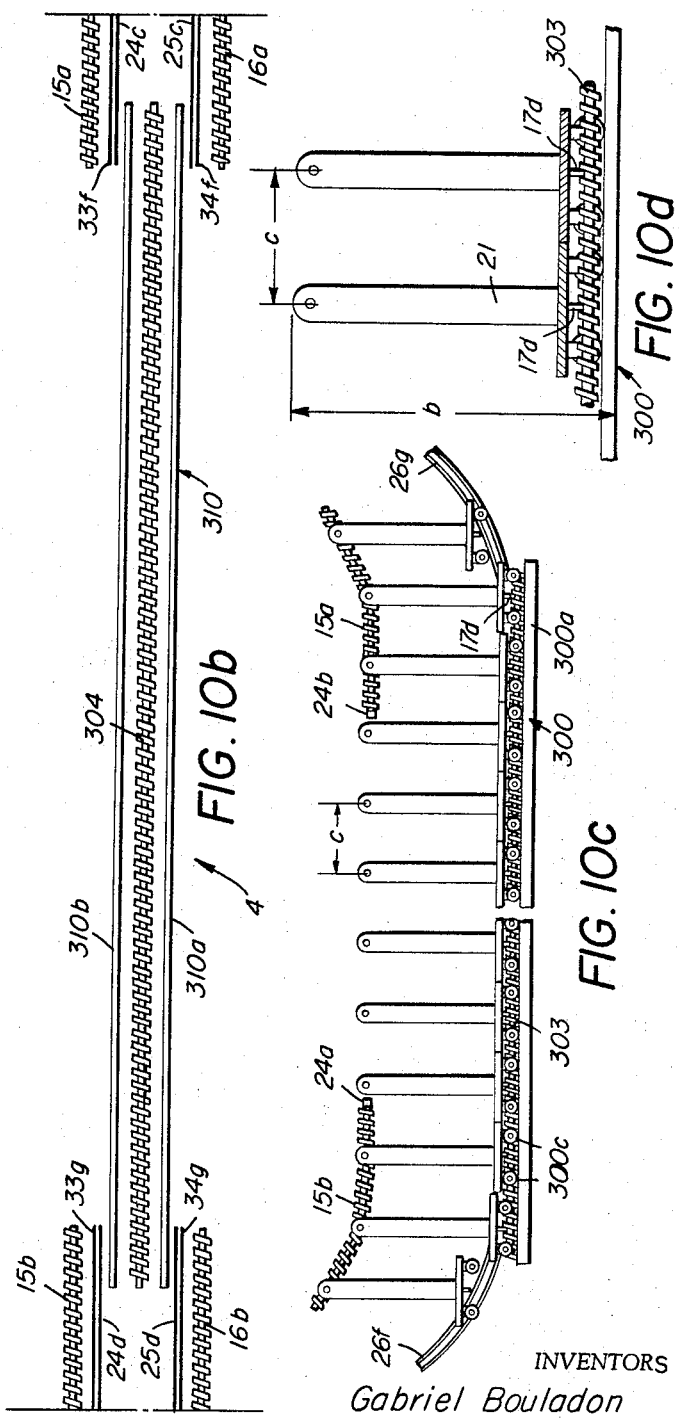

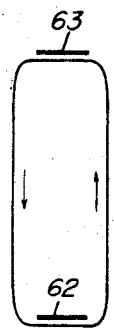   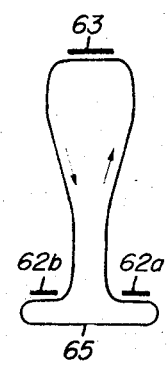
FIG. 11　　FIG. 12　　FIG. 14　　FIG. 15
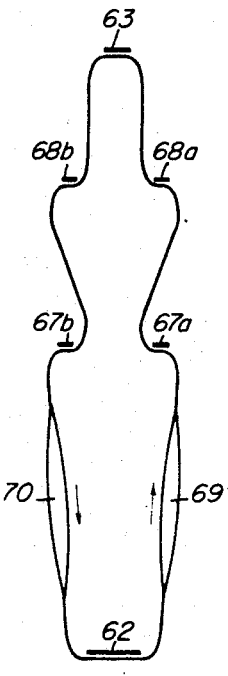  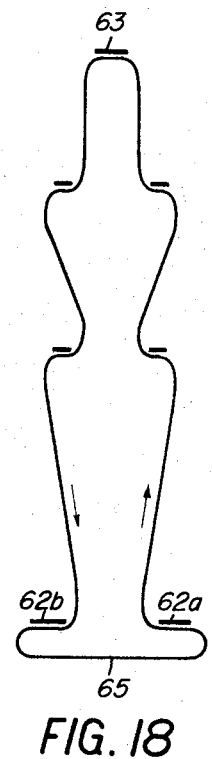
FIG. 16　　FIG. 17　　FIG. 18
INVENTORS
Gabriel Bouladon
Paul Zuppiger
ATTORNEY

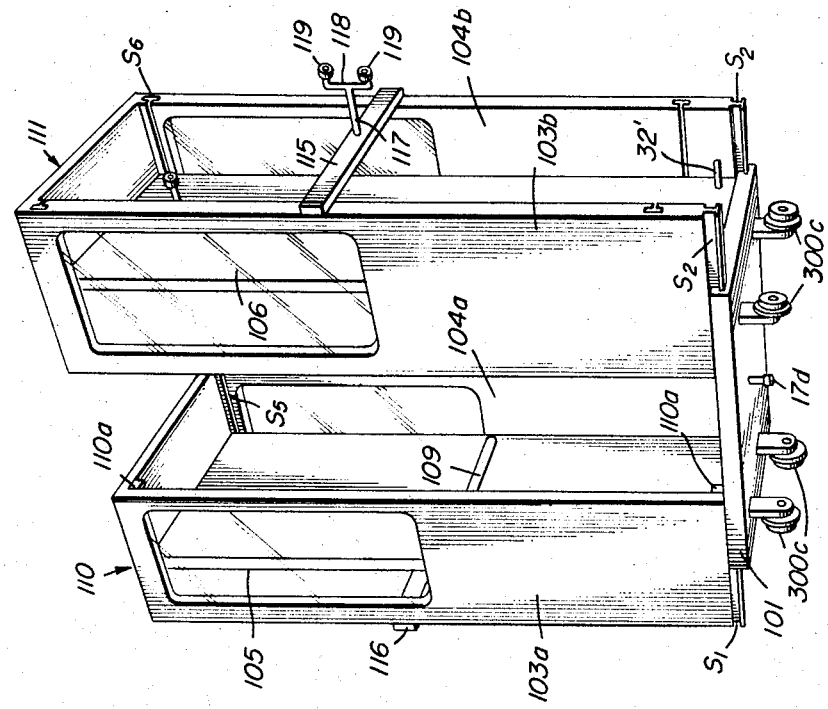
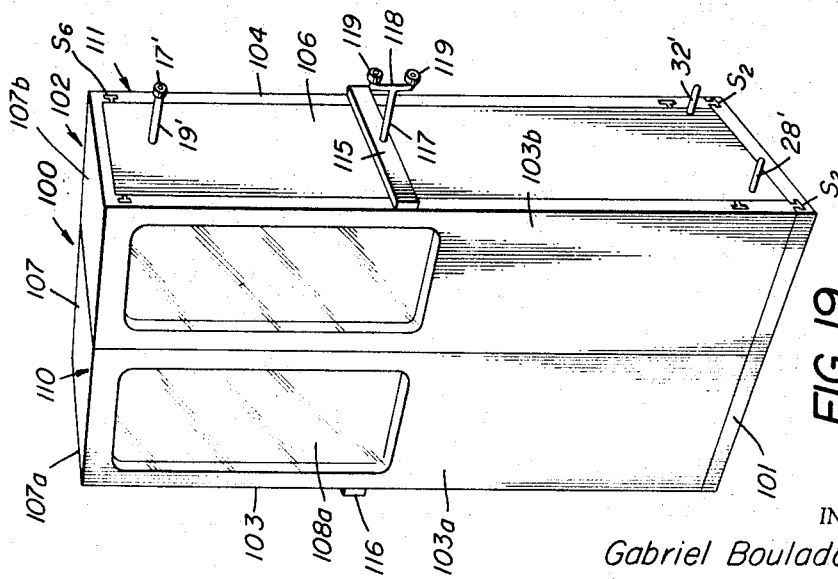

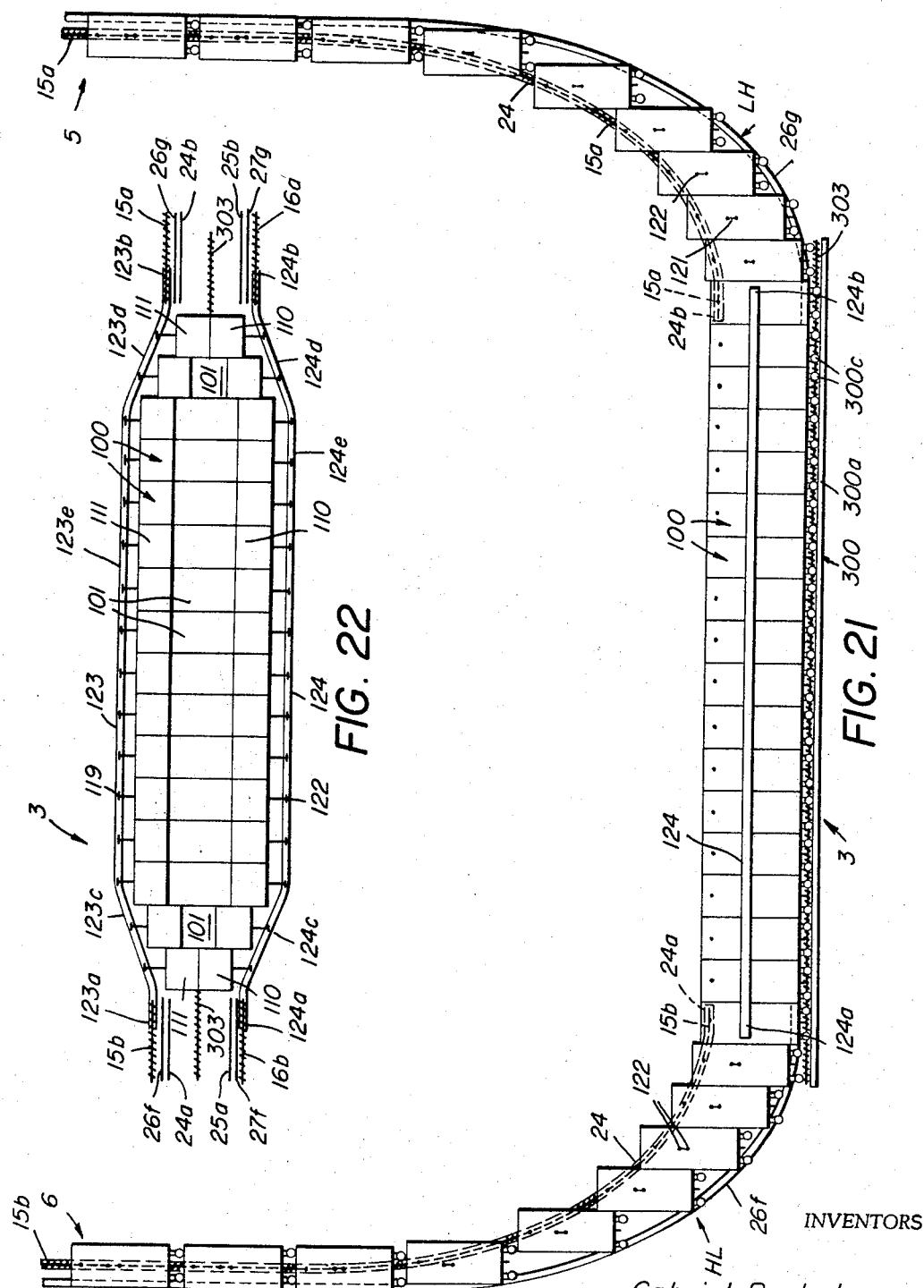

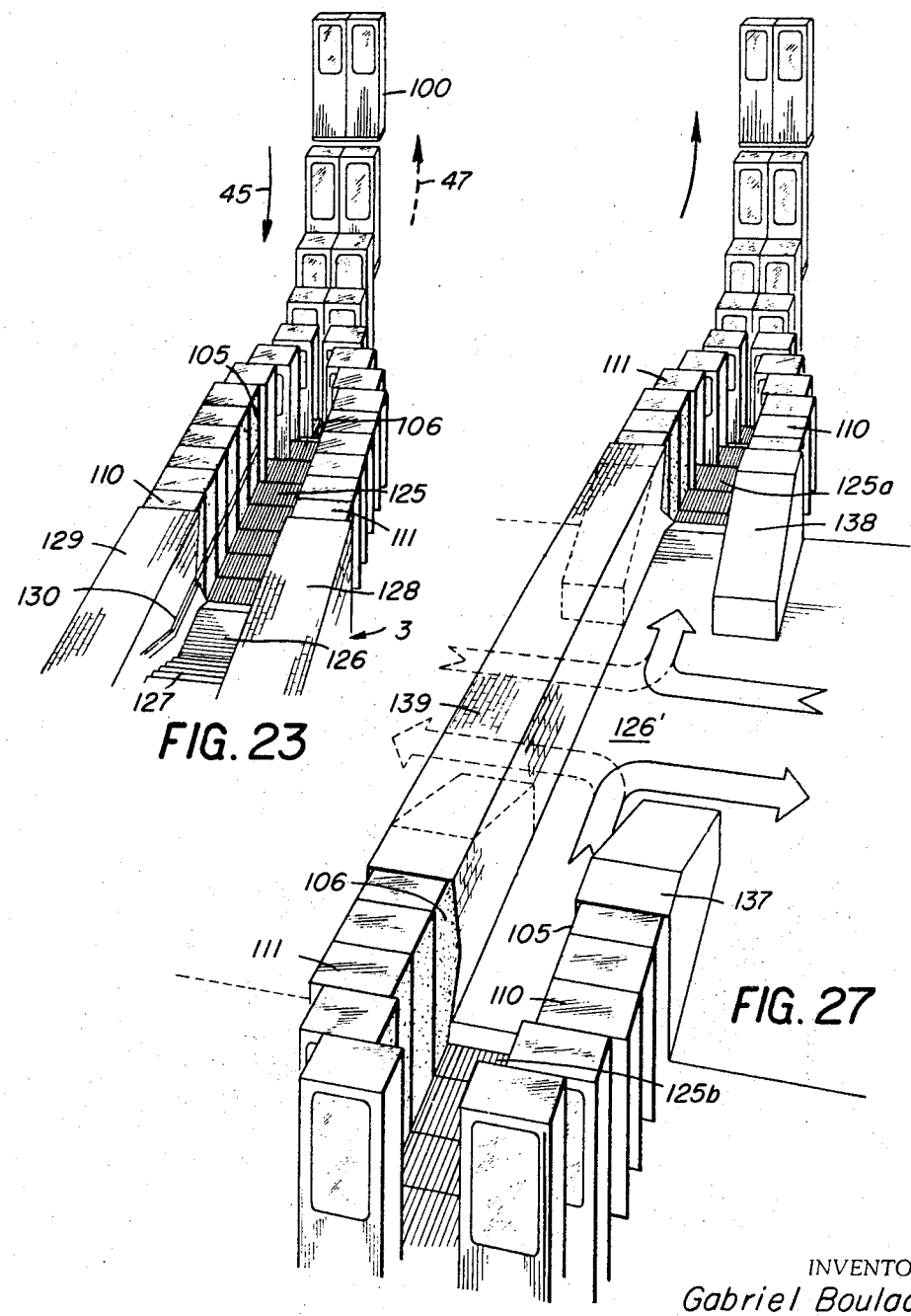

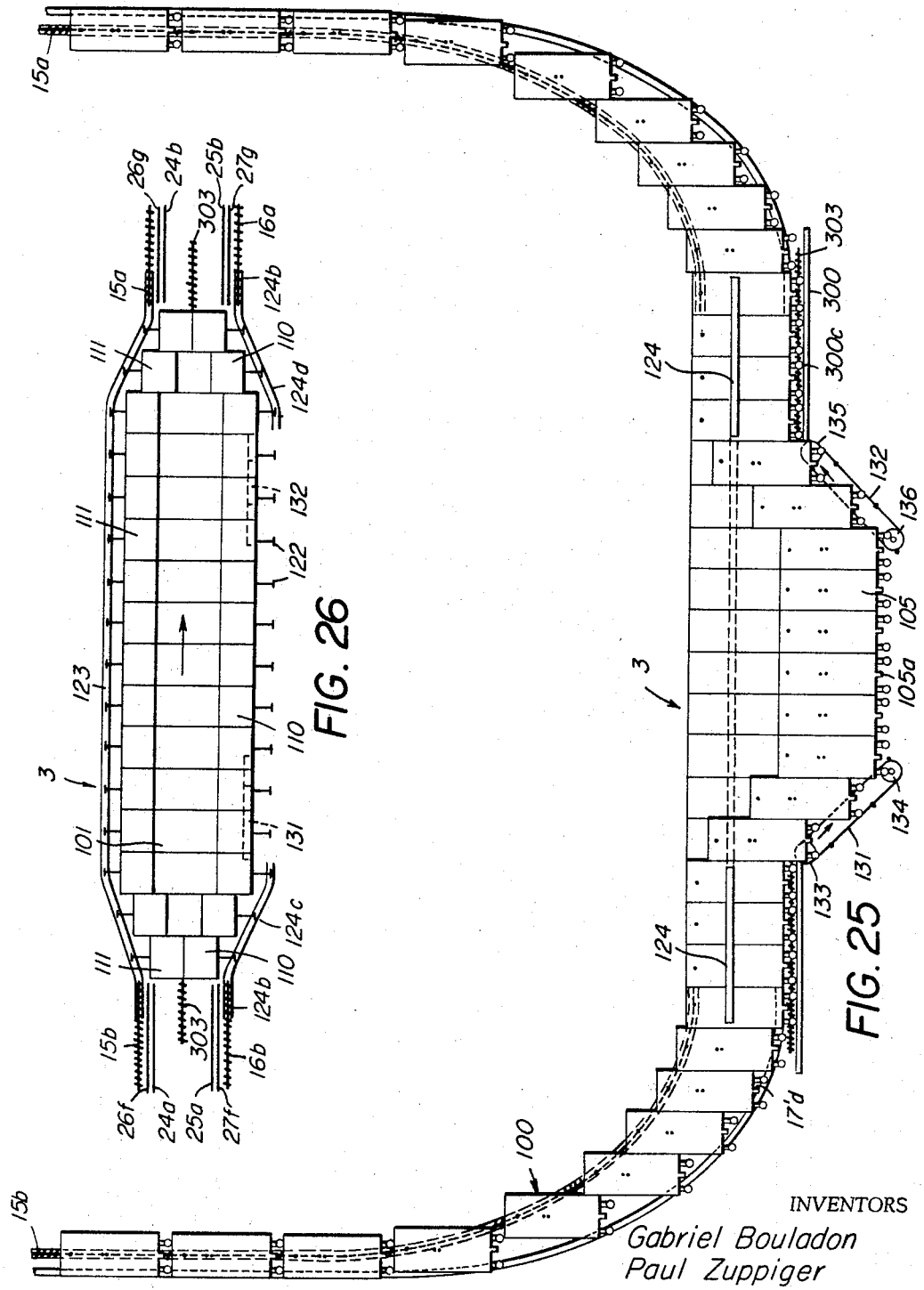

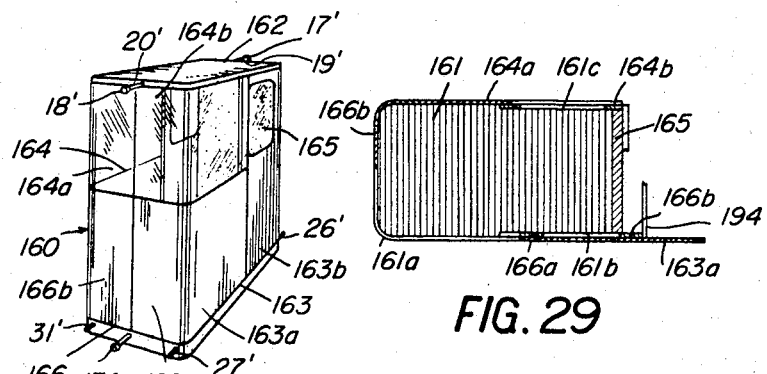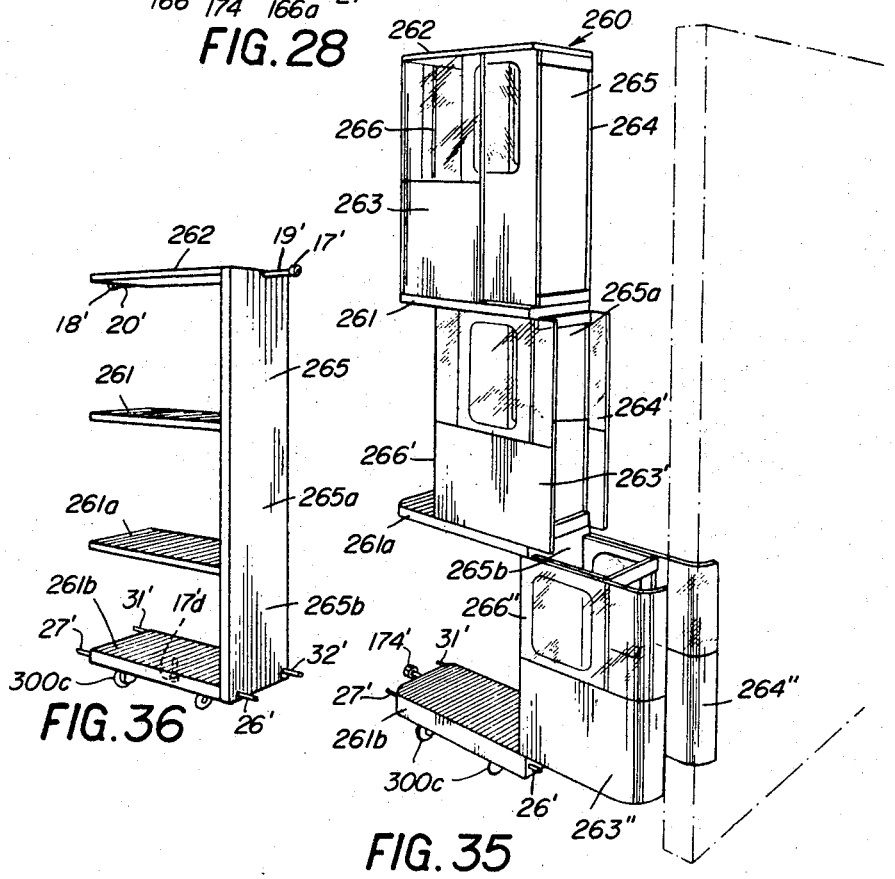

Nov. 14, 1967  G. BOULADON ET AL  3,352,250
TRANSPORT APPARATUS
Filed March 20, 1964  18 Sheets-Sheet 13

INVENTORS
Gabriel Bouladon
Paul Zuppiger
BY John B. Annenhart
ATTORNEY

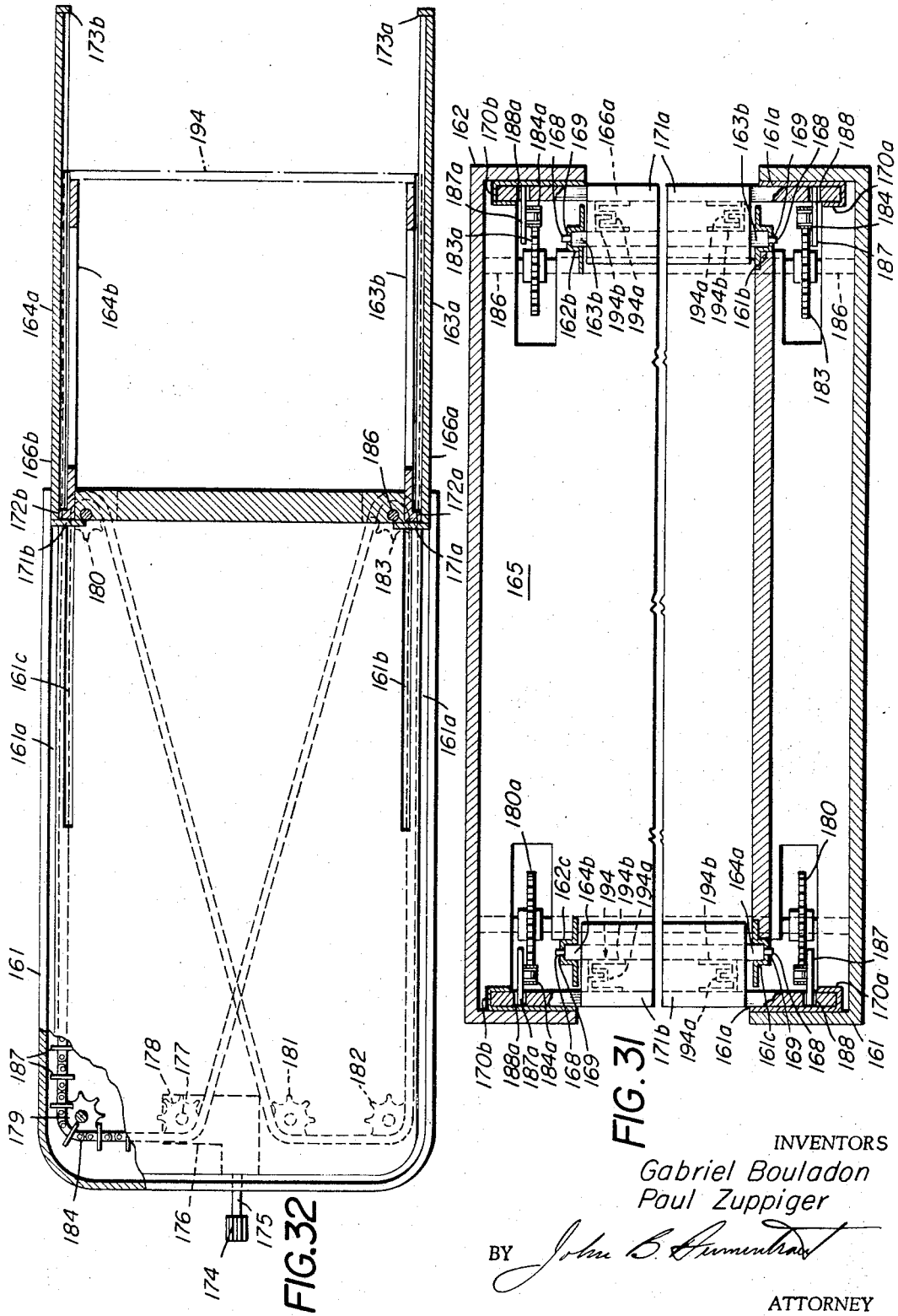

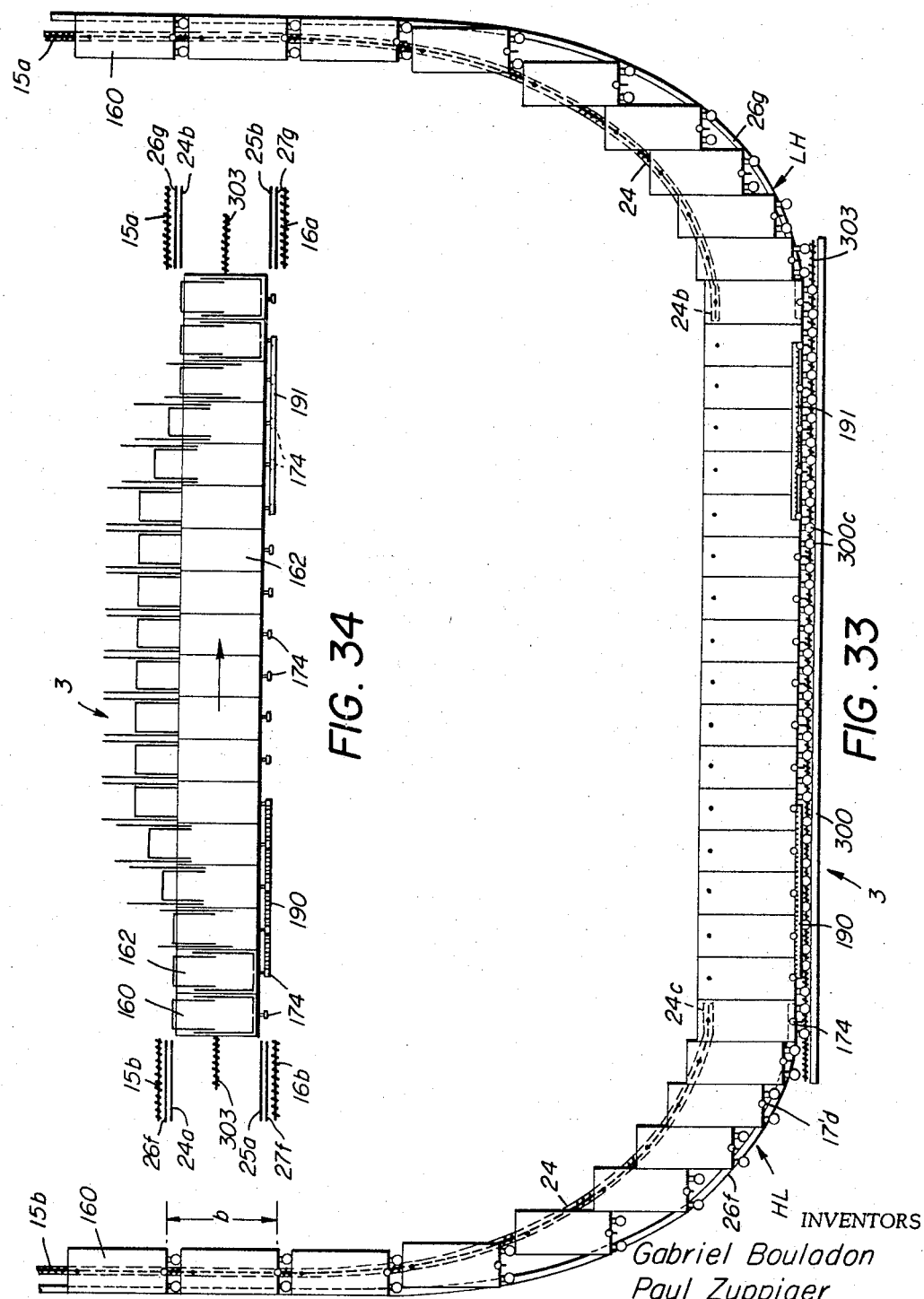

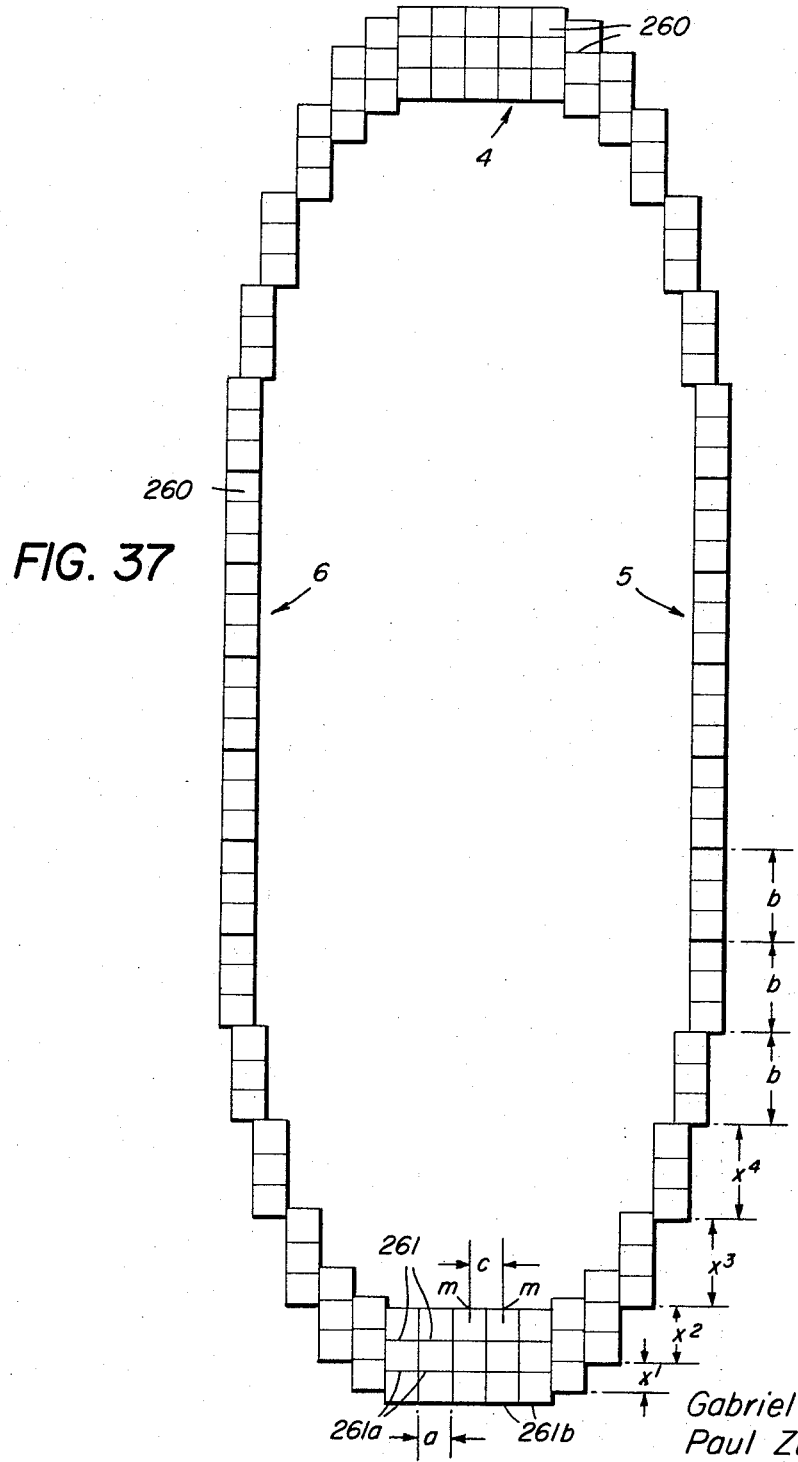

Nov. 14, 1967  G. BOULADON ET AL  3,352,250
TRANSPORT APPARATUS

Filed March 20, 1964  18 Sheets-Sheet 18

INVENTOR.
Gabriel Bouladon
Paul Zuppiger

United States Patent Office 3,352,250
Patented Nov. 14, 1967

3,352,250
TRANSPORT APPARATUS
Gabriel Bouladon, Versoix, Geneva, and Paul Zuppiger, Carouge, Geneva, Switzerland, assignors to The Battelle Development Corporation
Filed Mar. 20, 1964, Ser. No. 353,515
Claims priority, application Switzerland, Mar. 22, 1963, 3,667/63; June 6, 1963, 7,126/63
28 Claims. (Cl. 104—25)

This invention relates to transport apparatus having elevator units therein, and more particularly the invention is concerned with transport systems in which a plurality of elevator units are adapted to be moved circuitously.

An object of the present invention is the provision of varying speed transport apparatus having a plurality of elevator units which undergo low speed movement generally horizontally and which units travel from one level to another level at relatively high speed.

Another object of the present invention is that of providing transport apparatus of the character indicated in which the elevator units take different series relations to each other corresponding to the low and relatively high speeds, and while moving at progressively varying intermediate easement speed gradually effect change in alignment depending upon which of the low and relatively high speed movements is to ensue and which of the low and relatively high speed movements is being terminated.

Another object herein is the provision of apparatus of the character indicated which is capable of supplying elevator units in low speed progressions through loading and unloading locations for elevator units thus to be continuously available in these locations for loading and unloading, and between which locations the elevator units nevertheless accomplish expedited transport at relatively high speed while changing altitude.

Another object herein is the provision of varying speed transport apparatus further characterized by having platforms which take aligned low speed close formation while the units are traveling substantially horizontally rectilinearly and the platforms take elevated formation while the units are being driven at relatively high speed in elevated series relation.

A further object of the present invention is that of providing varying speed transport apparatus in which the elevator units include platforms having substantially horizontal positions not only in low and relatively high speed movements but in intermediate varying easement speed movement wherein the platforms undergo transition between an alignment having the platforms substantially parallel to each other in series and an alignment having the platforms side by side in series substantially in a horizontal plane.

Another object is the provision of varying speed transport apparatus of the character indicated wherein the elevator units may directly contact each other, or otherwise be in close proximity to each other, in each of the low speed, relatively high speed and intermediate varying speed zones and yet achieve varying speed movement.

A further object of the present invention is the provision of transport apparatus of the character indicated wherein the elevator units travel in an endless succession and are thus adjacent to each other one after another throughout the path of the circuit, accordingly for each successive elevator unit to move fully past the same point in the circuit only a short while after the immediately preceding unit has moved fully past that same point.

Another object of this invention is the provision of varying speed transport apparatus which is well suited for transporting people from one level to another and in which the elevator units effect generally horizontal movements for loading and unloading.

A further object of this invention is that of providing varying speed transport apparatus of the character indicated in which the elevator units include platforms, and passenger enclosures at least having portions for moving with respect to the platforms for the units to be opened and closed to passenger traffic while the units are moving through a loading and unloading location.

A further object is the provision of transport apparatus of the character indicated in which the elevator units take open and closed positions relative to platforms of the units for loading and unloading, and introduce a dwell in the open position, whereby one after another of the units in series simultaneously dwell open while moving.

Another object herein is the provision of transport apparatus of the character indicated in which the elevator units include housings having sides, or sides and tops, which are in alignment in prolongation of each other from unit to unit in a loading and unloading location while the platforms of the units in the latter location are substantially horizontal and in alignment in prolongation of each other.

Another object of the present invention is the provision of varying speed transport apparatus in which difference in elevation of the elevator units in the relatively high speed movement, and horizontal spacing of the midpoints of breadths of the same units in the low speed movement, give latitude for a very satisfactory speed change and for change from one to another of highly useful alignments respectively corresponding to the low and relatively high speed movements.

Another object of this invention is the provision of varying speed transport apparatus of the character indicated in which elevator units have greater similar heights than similar breadths thereof and travel at low speed breadthwise having the midpoints of breadth spaced apart a distance less than heighth of the unit and at least equal to breadth, and at relatively high speed with platforms of the units at elevations differing from unit by an amount at least equal to heighth of the unit, thus for speeds and alignments to be changed.

Other objects of the invention in part will be obvious and in part pointed out more fully hereinafter.

The attached drawings represent by way of example embodiments of varying speed transport apparatus which are in accordance with the present invention, and FIGURE 1 is a diagrammatic view of a guide circuit and of an endless succession of elevator units associated with the guide circuit in varying speed transport apparatus;

FIGURE 2 is a side elevation of one of the elevator units and of adjacent portions of the drive and guide means, corresponding to the apparatus of FIGURE 1;

FIGURE 3 is a sectional plan view taken at III—III in FIGURE 2;

FIGURE 4 is a sectional elevational view taken at IV—IV in FIGURE 2;

FIGURE 5 is a schematic representation corresponding to the preceding figures of the drawing and showing portions of the drive and guide means in relation to landings associated with the varying speed transport apparatus;

FIGURE 6 is a schematic showing relating to another embodiment and is directed to certain portions of drive and guide means in association with landings served by the varying speed transport apparatus;

Figure 30:
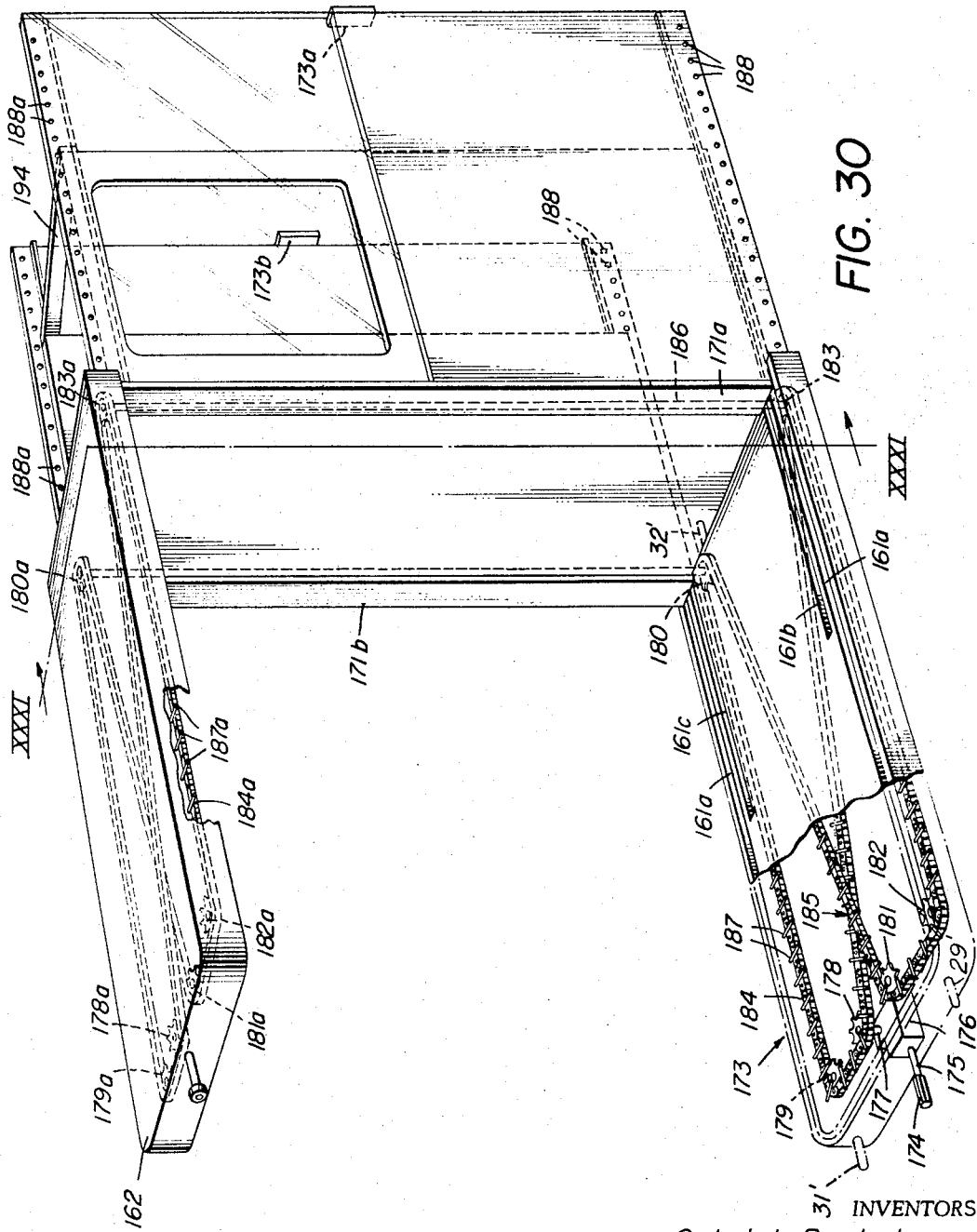
Figures 38, 41:
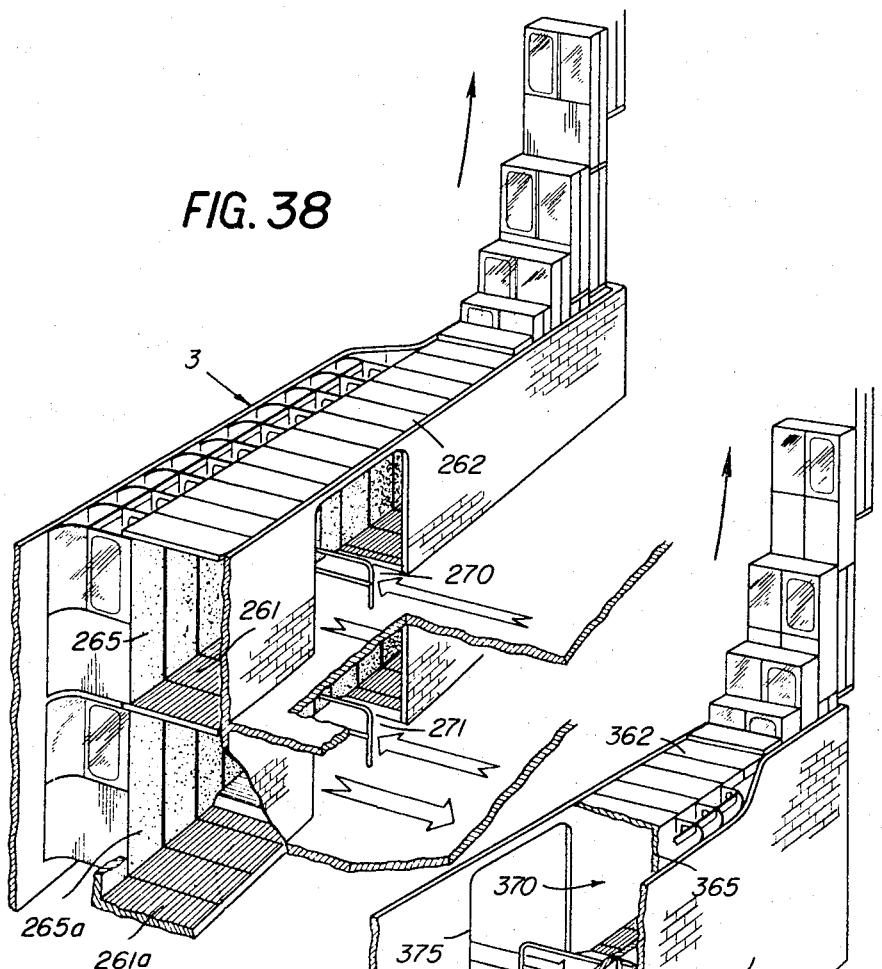
Figures 39, 40:
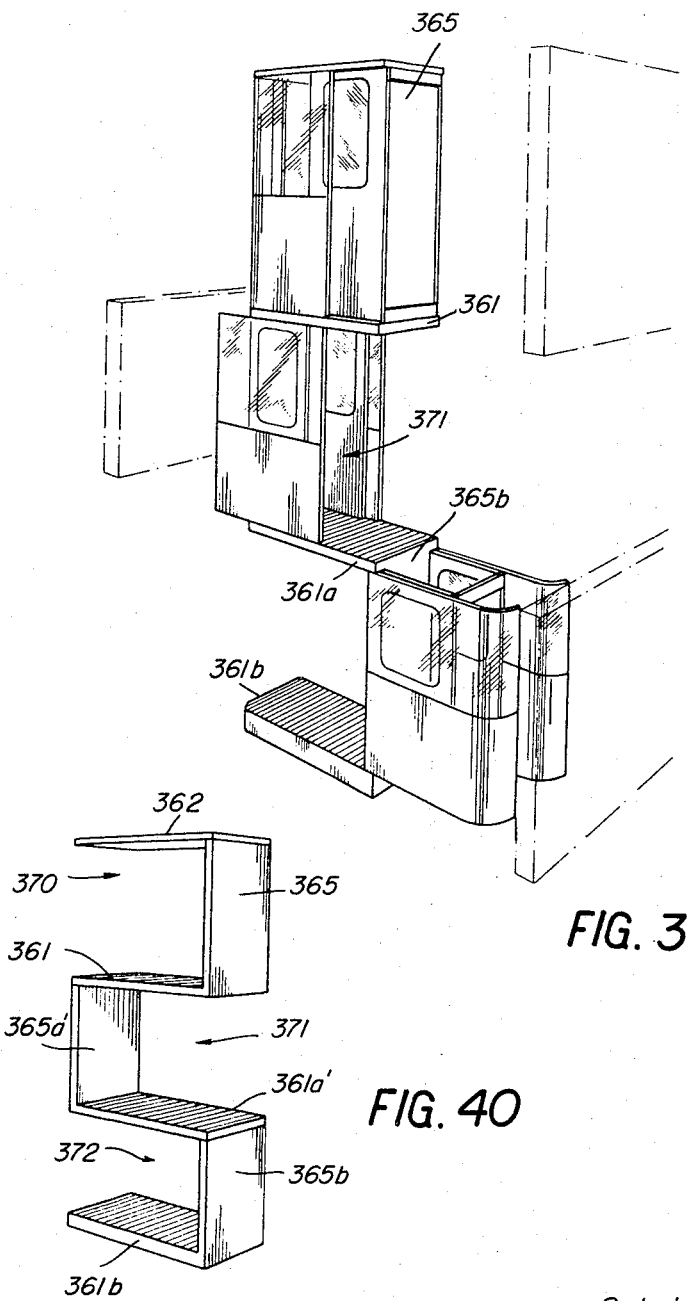

FIGURE 7 corresponds to the apparatus of FIGURE 6 and is a side elevation of one of the elevator units and of related portions of the drive and guide means;

FIGURE 8 is a plan view in section taken at VIII—VIII in FIGURE 7;

FIGURE 9 is an elevational view taken in section IX—IX in FIGURE 7 and thence extended and broken away and further extended to provide showing of additional elevator units and their relation to portions of the drive and guide means;

FIGURE 10 is a schematic view of another form of the varying speed transport apparatus, and more particularly indicates portions of the drive and guide means in association with landings adjacent to the apparatus;

FIGURES 10a and 10b are schematic plan views of drive and guide means and respectively corresponding to lower and upper locations in FIGURE 10;

FIGURE 10c is a schematic elevational view corresponding to FIGURE 10a and elevator units have been added;

FIGURE 10d is similar to FIGURE 10c but indicates a relatively open formation of the elevator units in their alignment with each other;

FIGURES 11 to 18, inclusive, are circuit diagrams which illustrate a few of the various configurations of transport systems which are constructed and operated in accordance with the present invention;

FIGURES 19 and 20 are perspective views respectively from different vantage points of a modified form of elevator unit having utility in a varying speed transport system;

FIGURES 21 and 22 are respectively diagrammatic elevational and plan views of lower portions of a circuitous varying speed transport system having therein an endless succession of the elevator units of FIGURES 19 and 20;

FIGURE 23 is a perspective view corresponding to FIGURES 21 and 22 and adds showing of a stairway and landing facility;

FIGURE 24 is a perspective view of a modified form of elevator unit as compared with that in FIGURES 19 and 20;

FIGURE 24a is a fragmentary plan view partially in horizontal section and corresponds to FIGURE 24;

FIGURES 25 and 26 are diagrammatic elevational and plan representations, respectively, of lower portions of a circuitous varying speed transport system having an endless succession of the elevator units of FIGURE 24 therein to characterize the system;

FIGURE 27 is in perspective and corresponds to FIGURES 25 and 26, with a landing and related structure added;

FIGURE 28 is a perspective view of still another form of elevator unit having utility in a varying speed transport system;

FIGURE 29 is a plan section of FIGURE 28;

FIGURE 30 is an isometric representation of details in the elevator unit of FIGURES 28 and 29;

FIGURE 31 is a broken away transverse section taken at XXXI—XXXI in FIGURE 30;

FIGURE 32 is a detail, broken away, of movable side portions of the elevator unit of the immediately preceding figures of the drawing;

FIGURES 33 and 34 provide schematic representations in elevation and plan, respectively, of lower portions of a circuitous varying speed transport system having therein an endless succession of the elevator units of FIGURES 28 and 29;

FIGURE 35 is a perspective view of plural platform elevator unit;

FIGURE 36 corresponds to FIGURE 35 and more particularly is directed to the frame of the unit;

FIGURE 37 is a schematic view of a varying speed transport system having therein an endless succession of the elevator units of FIGURE 35;

FIGURE 38 is a fragmentary perspective view corresponding to a lower region of FIGURE 37, and associates the elevator units in the region with a station having landings at upper and lower local levels;

FIGURES 39 and 40 respectively are perspective views of still another elevator unit and its frame; and FIGURE 41 shows in perspective a lower fragment of a varying speed transport system having therein an endless succession of the elevator units of FIGURE 39, the view being in a lower region of the system and indicating upper and lower local levels in a station through which the elevator units travel.

Referring now more particularly to FIGURES 1 to 5e, an embodiment of varying speed transport apparatus represented includes a succession of similar elevator units 10 in driven and guided engagement with drive and guide means and the apparatus is characterized by the fact that the elevator units in their conjoint operation with the drive and guide means travel at speeds which vary with location of the units 10 which are present. Suitably mounted circuitous guide means 1w, diagrammatically shown in FIGURE 1, defines a mechanically effectively closed loop guide circuit extending substantially horizontally rectilinearly through low speed zones 3 and 4, and substantially vertically rectilinearly through transport or relatively high speed zones 5 and 6 which respectively correspond to upward and downward travel of the elevator units 10. Further, the guide means 12 is curved through varying speed zones HL and LH between the low and relatively high speed zones.

The guide means 12 engages the elevator units 10 to guide the units for being driven at low speed breadthwise through first series of positions in the low speed zones 3 and 4 and for the elevator units within the corresponding first series of positions to be substantially horizontally aligned with each other at loading and unloading stations such as for goods or persons. While the elevator units in accordance with the present invention, and facilities for loading and unloading, may take many possible forms, units 10 in the present embodiment each include a generally rectangular platform 11 and these platforms of the units in the first series of positions are aligned with each other and are substantially horizontal such as to serve as adjacent components of a continuously moving low speed floor in positions 3a to 3b in the low speed zone 3 and in positions 4a to 4b in the low speed zone 4. A lower level station, as in a building, is provided having a landing 13 adjacent to the platforms 11 in positions 3a to 3b, and an upper level station, as in the same building, similarly includes a landing 14 adjacent to the platforms 11 in the positions 4a to 4b. The platforms in these positions lead to and thence under and away from the respective landings and preferably have their top surfaces substantially in common planes just below the landings.

Units 10 have similar breadths $a$, and are guided by the guide means 12 for the units to be driven each at substantially the same low speed $V_L$ through the first series of positions referred to while having midpoints $m$ of these breadths spaced apart about the same distance $c$ horizontally from unit to unit amounting to at least about breadth $a$ of the unit. Thus the units may even have the platforms 11 in contact with each other to provide close formations in their substantially horizontal alignments. Guide means 12 also engages the elevator units 10 to guide these units to be driven each at substantially the same relatively high speed $V_H$ in elevated relations one with respect to the next through second series of positions up and down respectively in the relatively high speed zones 5 and 6 as indicated in FIGURE 1. More particularly the elevator units 10 are guided for the units when driven through the second series of positions to have their platforms 11 in the second series of positions substantially horizontal while these same platforms introduce about the same difference $b$ in elevation from unit to unit appreciably exceeding the distance $c$ of spacing of the midpoints $m$ of the breadths of the units in the first series of positions in the low speed zones 3 and 4.

In each of the varying speed zones HL and LH the elevator units 10 are guided by the guide means 12 for being driven from one of the first and second series of positions respectively corresponding to the adjacent low and relatively high speed zones, and more particularly the units are guided for being driven vertically and breadthwise through a third series of positions at varying speed which progressively increases from the low speed $V_L$ at the low speed end of the varying speed zone to the relatively high speed $V_H$ at the high speed end of the varying speed zone and for the units in each of the varying speed zones to be in a stepped elevated relation and have their axes which are transverse to breadth $a$, substantially parallel between the adjacent low and relatively high speed zones, with difference in elevation of the units being major adjacent to the high speed end of the varying speed zone and varying to difference in elevation of the units being minor adjacent to the low speed end of the varying speed zone. The platforms 11 of the units 10 in each of the third series of positions are substantially horizontal and are stepped from overlying to outlying from the high speed end of the varying speed zone to the low speed end of the varying speed zone with difference in elevation of these platforms being major and substantially the difference $b$ already mentioned adjacent to the high speed end of the varying speed zone and progressively decreasing through differences $x^4$, $x^3$ and $x^2$ in elevation of these platforms to being a minor difference $x^1$ adjacent to the low speed end of the varying speed zone.

Since it is a fact that the same drive, guide, and guide following arrangement is feasible for each of the elevator units 10 employed in the present embodiment, it will at the outset therefore suffice to refer to a typical one of these elevator units shown in FIGURES 2, 3, and 4 of the drawing, wherein the particular elevator unit represented is on the up transport side of the apparatus corresponding to the relatively high speed zone 5 in FIGURE 1. The guide means 12 includes a pair of guides 24 and a corresponding co-extending pair of guides 25 and these pairs of guides are circuitous consistent with the diagram of FIGURE 1, the guides in the pairs being spaced apart to confine in through-extending relations guide follower and driven members 19 and 20 secured to supports 21 and 22 which carry the platform 11 parallel to a common axis 30 of the guide follower and driven members, the latter axis being transverse to the breadth $a$ of the unit 10 and overlying the platform centrally between opposite sides of the platform as indicated in FIGURE 3. Advantageously, the members 19 and 20 support rollers 19a and 20a, having diameters slightly less than the spacing of the guides in the pairs 24 and 25 for the elevator unit 10 to engage the guides in anti-friction contact. Further, the guide means 12 includes companion slideways 26 and 27 and also companion slideways 33 and 34, each of which is of channel form in cross section. By referring to FIGURES 1 and 5, it will be seen that slideways 26 and 27 are generally U-shaped from end to end, extend under opposite sides of the platform 13, and have legs on the up and down sides of the guide system so as to cooperate with the guides 24 and 25. The legs of these two slideways terminate in the upper regions 5a and 6a of the transport zones and in these regions co-extend for short distances with leg ends of the slideways 33 and 34 for maintaining continuity of guidance. Slideways 33 and 34 take inverted U-form from end to end and have intermediate portions under opposite sides of the landing 14 of the system. Slideways 27 and 34 co-extend with and are equidistantly spaced from the slideways 33 and 26, and the channel recesses of the opposed slideways confront each other for the slideways to accommodate fingers 28, 29, 31 and 32 in guide following relations in these recesses. Fingers 28 and 29 project in axial alignment with each other from opposite ends of one of the sides of the platform 11 (FIGURES 1 and 3) while fingers 31 and 32 on the opposite side of the platform also project in axial alignment with each other from the ends of the platform. The fingers and slideways cooperate with members 19 and 20 and their guides 24 and 25 for the corresponding elevator unit 10 to be guided and the platform 11 to be maintained substantially horizontal throughout circuitous travel of the elevator unit in the system. In the position of the elevator unit 10 in FIGURES 2 to 4, inclusive, finger 28 is engaged with slideway 26 by projecting into the recess of this slideway and finger 29 is engaged with the slideway 27 in the recess of the latter slideway thus to cooperate with the guide following and driven members 19 and 20 for maintaining the platform substantially horizontal.

Further, in accordance with the present embodiment, each elevator unit 10 is in driven engagement with sets 15 and 16 of suitably mounted rotary drive screws for the elevator units to be moved circuitously while guided by the guide means 12. As will be noted in FIGURES 2 and 3, the screw sets 15 and 16 are situated outside the guides 24 and 25 respectively and the screws of sets drivingly engage rollers 17 and 18 correspondingly on the outer ends of members 19 and 20 from which the elevator unit 10 and its platform 11 depends. Like connections exist between the screw sets 15 and 16 and the other elevator units of the system, just as fingers 28, 29, 31 and 32 on the platforms 11 of the other elevator units of the system cooperate with the slideways 26, 27, 33 and 34.

The screws in the respective screw sets 15 and 16 are drivingly disposed in the orbits defined by the rollers 17 and 18 under the guidance afforded by the guide means 12 to the corresponding elevator unit 10. Like screws in the corresponding sets 15 and 16 co-extend and co-act and therefore the ensuing description will in the main be directed to the screw set 15 for purposes of disclosure of the two sets 15 and 16. Thus, the screw set 15 includes two opposed screws 15a and 15b (FIGURE 5) which are 180-degree replicas and conjointly have pitches for the elevator units to be driven in a circuitous direction indicated by the up and down arrows. Moreover, the pitch of the portions of the screws 15a and 15b in the low speed zones 3 and 4 is a substantially constant low speed pitch, while the pitch of the portions of the screws 15a and 15b in the transport or relatively high speed zones 5 and 6 is a substantially constant relatively high speed pitch. The screws 15a and 15b further extend through the varying speed zones HL and LH of the apparatus between the low and high speed zones. The pitch of the screws in the varying speed zones progressively increases from the low speed ends of the varying speed zones and the low speed pitch of the screws in the low speed zones 3 and 4, to the high speeds ends of the varying speed zones and the relatively high speed pitch of the screws in the relatively high speed zones 5 and 6. Accordingly, the screws 15a and 15b in the varying speed zone HL in FIGURE 5 have progressively decreasing pitch leading respectively into the low speed zones 3 and 4, and further it will be appreciated that these same screws in the varying speed zones LH have progressively increasing pitch leading out of the low speed zones 3 and 4 into the high speed zones. The screws in screw set 16 have the same characteristics as the screws in set 15. The ratio of the pitches of the screws in each set 15 and 16 in the low speed zones 3 and 4 to the pitches of these same screws in the relatively high speed zones 5 and 6 is equal to the ratio of $c$, the distance of spacing of the midpoints $m$ of the similar breadths $a$ of the units 10 in the series of positions extending from 3a to 3b and from 4a to 4b in the low speed zones 3 and 4, to $b$, the difference in elevation of the platforms 11 from elevator unit to elevator unit in the corresponding series of positions in the relatively high speed zones 5 and 6.

Each portion of the screws 15a, 15b, 16a, and 16b which is in the varying speed zones HL or LH illustratively comprises a plurality of suitably journaled and mounted substantially rectilinear sections in the corresponding one of these zones. An understanding of this particular structure can best be had through referring to FIGURE 5e which introduces detail relating to that portion of screw 15a which is located in the varying speed zone HL indicated at the upper righthand side of FIGURE 1 between the relatively high speed zone 5 and the low speed zone 4. This portion of screw 15a has typically a plurality of substantially rectilinear screw sections, such as $15a^1$–$15a^6$. The adjacent ends of these sections of the screw are interconnected by universal couplings not shown in detail but indicated by reference characters $c^1$–$c^5$. The substantially rectilinear sections $15a^1$–$15a^6$, in view of their universal connections, form chords of the mean curved guide path followed by roller 17 as it is guided in the system through the varying speed zone occupied by the sections $15a^1$–$15a^6$. The maximum departure of the screw sections from this mean guide path is maintained at a minimum whereby roller 17 is continuously in driven engagement with these screw sections for the related elevator unit to be advanced from the relatively high speed zone 5 into the low speed zone 4 in accordance with the progressively varying pitch of the threads of the screw. Screw portion 16a includes companion sections $16a^1$–$16a^6$ for aiding the screw portion 15a in the corresponding zone. The screws in sets 15 and 16 in the other varying speed zones of the system are likewise constructed and have their pitches varying from the low speed end to the high speed end in each of the varying speed locations.

The screws in the sets 15 and 16 are rotatably driven as an established constant speed by any suitable motor unit or units, not shown, and the drive is suitably synchronized for the screws and guide means to maintain the elevator units in their driven relations. The motor or motors are conveniently connected to the screws at the screw ends adjacent to the landing 13 or 14 or both. The screws in the sets discontinue along the low speed zones 3 and 4 wherein the elevator units 10 push one another in side to side contact for being advanced in the circuit while out of direct engagement with the screws. In certain instances the portions of the screws in sets 15 and 16 in the low speed zones are entirely omitted, the screws of the sets thus terminating at the low speed ends of the varying speed zones HL and LH.

Figure 5A:
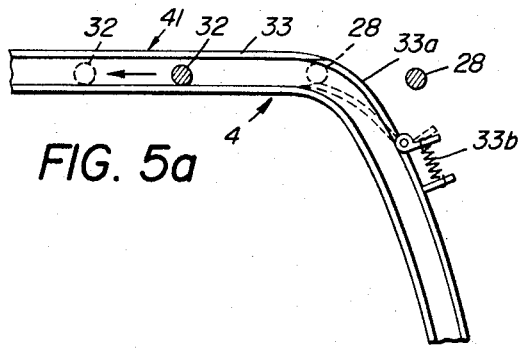
FIGURES 5a to 5d are detail views pertaining to structure of the guide means.
Figure 5B:
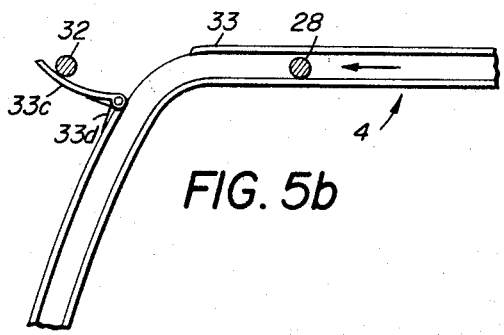
Figure 5C:
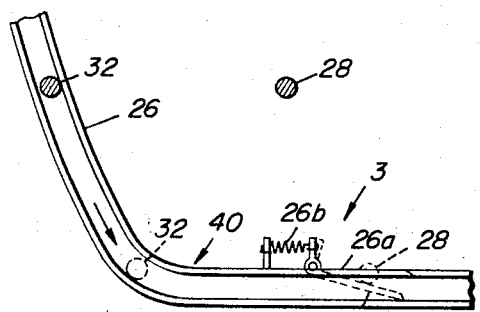
Figure 5D:
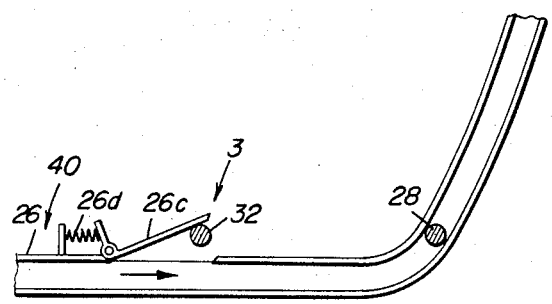
Figure 5E:
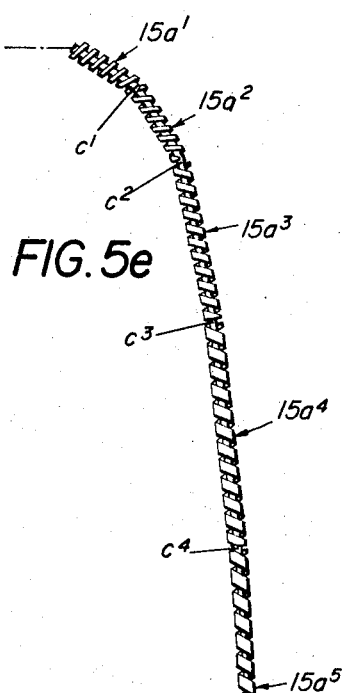
FIGURE 5e is a detail relating to a portion of the drive means, the various details being associated with the apparatus of FIGURES 1 to 5.

Slideways 26 and 27 in the low speed zone 3 (FIGURE 1) and slideways 33 and 34 in the low speed zone 4 guidedly accommodate all four fingers 28, 29, 31 and 32 of the platforms 11 the elevator units including these platforms pass through the low speed zones. Reference is had to FIGURES 5a to 5d to illustrate how this is possible. In FIGURE 5a finger 32 as indicated in full lines is following slideway 33 generally horizontally in the direction of the arrow as the platform 11 (not shown) enters the low speed zone 4. Finger 28 on the same platform and as indicated in full lines is advancing toward the slideway 33 and has not as yet contacted this slideway. The outermost flange of the slideway 33 includes an inwardly opening gate 33a in the path of finger 28 and the gate is normally biased closed as indicated by the full line position of tension spring 33b. As the platform continues to advance into the low speed zone 4, as represented by the fingers 28 and 32 in their dotted line positions, gate 33a is displaced inwardly by finger 28 which then enters the slideway 33 for the platform to continue its movement through zone 4 with both fingers 28 and 32 engaging the slideway 33. A like gate, not shown, is provided in slideway 34 and is actuated by finger 29 for both of the fingers 29 and 31 to occupy this slideway during travel of the platform through the low speed zone 4. At the opposite end of this same low speed zone from gate 33a, and the companion gate in slideway 34, both slideways 33 and 34 again have normally closed gates in their outermost flanges, such as gate 33c in FIGURE 5b, and which are the outwardly opening opposites of gate 33a and its companion gate so that fingers 32 and 31 may escape from the slideways 33 and 34 and eventually engage respectively slideways 26 and 27.

As the platform of each corresponding unit 10 is further moved in the system and approaches the low speed zone 3 with fingers 32 and 31 engaged in the respective slideways 26 and 27, all four fingers 28, 29, 31 and 32 are eventually guidedly accommodated by slideways 26 and 27. Thus, in FIGURE 5c, each platform while generally horizontal and with finger 32 in the slideway 26 and traveling with finger 28 as shown in full lines in the direction of the arrow, has finger 28 (on dotted line position) encounter an inwardly opening gate 26a hingedly forming an component of the uppermost flange of this slideway. The gate is normally closed under the bias of spring 26d but is urged open by finger 28 which then in its advance enters the slideway 26 and moves in this slideway with finger 32 through the low speed zone 3. An opposite like gate (not shown) in slideway 27 admits finger 29 which then is guided by the latter slideway along with finger 31 through the low speed zone 3. At the other end of the latter low speed zone the slideways 26 and 27 have normally closed outwardly opening gates in their uppermost flanges, such as gate 26c in FIGURE 5d so that fingers 32 and 31 may escape from the slideways 26 and 27 and eventually engage respectively the slideways 33 and 34.

The screws in sets 15 and 16 in being rotated therefore propel the elevator units 10 circuitously in close formations along the guide means 12, and though the screws discontinue in the regions of landings 13 and 14 the elevator units themselves in these regions transmit the drive one to another for the circuitous movements of the units to continue. The elevator units advance breadthwise through the first series of positions 3a to 3b and 4a to 4b at same low speed $V_L$. Platforms 11 themselves have similar breadths which represent the breadths a of the units and are in contact with each other during travel in these regions. It follows that distance c between the midpoints of the elevator units is substantially equal to breadth a of the unit, although as will be pointed out more fully hereinafter distance c may in certain embodiments exceed breadth a of the units such as for the elevator units to be out of contact with each other in first series of positions akin to positions 3a to 3b and 4a to 4b while each unit nonetheless is moving at same low speed $V_L$.

Circuitously advancing elevator units 10 meanwhile engage the portions of the screws in sets 15 and 16 which have substantially constant relatively high speed pitch through the relatively high speed or transport zones 5 and 6, and accordingly the units travel upward in zone 5 and downward in zone 6 at relatively high speed through second series of positions including those indicated by the units 10 in these zones in FIGURE 1, the platforms 11 in these series of positions being substantially horizontal and differing in elevation from unit to unit by amount b which appreciably exceeds the distance c of spacing of the midpoints m of the units in the first series of positions in the low speed zones 3 and 4. While in certain instances, still in accordance with the present invention, relatively high speed $V_H$ may within limits vary from unit to unit between the opposite ends of the relatively high speed or transport zones, as by varying the pitch of the related sections of the screws within the relatively high speed range, it is preferred to maintain the ratio $c/b$ of the distance between the midpoints of similar breadth of the elevator units and difference in elevation of the platforms, substantially equal to the ratio $V_L/V_H$ of the related speeds of the units.

In the varying speed zones HL and LH indicated in FIGURE 1, the varying pitch portions of the screws in sets 15 and 16 engage the elevator units 10, and propel the units from one of the first and second series of positions corresponding to the varying speed zone to the other of the first and second series of positions corresponding to the varying speed zone, the propulsion being vertically and breadthwise through third series of positions represented for example by the elevator units illustrated in the varying speed zones. The speed of propulsion of each unit increases from the speed $V_L$ at the low speed end of the related varying speed zone to the relatively high speed $V_H$ at the relatively high speed end of the related varying speed zone. The units as driven through the third series of positions have their axes 30 which are transverse to breadth a substantially parallel and the platforms 11 substantially horizontal and stepped from overlying to outlying from the relatively high speed end of the related varying speed zone to the low speed end of the related varying speed zone, with major difference in elevation of the platforms being adjacent to the high speed end of the related varying speed zone and varying through decreasing differences $x^4$, $x^3$ and $x^2$ to minor difference $x^1$ in elevation of the platforms adjacent to the low speed end of the related varying speed zone. The units 10 themselves introduce difference in elevation from unit to unit which is major adjacent to the high speed end of the varying speed zone and which varies to being minor adjacent to the low speed end of the varying speed zone, and are stepped from overlying to outlying from the relatively high speed end of the related varying speed zone to the low speed end of the related varying speed zone.

The varying speed transport apparatus in certain embodiments has a suitably mounted modified drive means which accordingly includes thrust and endless carrier means for the elevator units to be driven in circuitous direction and thus circuitously while the elevator units in up and down high speed zones of the system are carried in counterbalance on the opposite sides of the system. Thus, for example in FIGURES 6 to 9, inclusive, the varying speed transport apparatus includes the same guide and guide following arrangement as has already been set forth with reference to the embodiment of FIGURES 1 to 5e, inclusive. As shown in detail in FIGURES 7, 8 and 9, though, the elevator units 10 are modified in that the members 19 and 20 respectively have lateral projections 17a and 17b and lateral projections 18a and 18b extending outwardly in opposite directions outside the pairs of guides 24 and 25 for engaging a pair of endless carriers 50 and 55 such as endless chains, for the elevator units to be counter-balanced in the up and down transport or relatively high speed zones 5 and 6 indicated in FIGURE 6. Also, it will be noted that endless carrier 50 is supported on rotary components 51, 52, 53 and 54, such as sprockets, whereby the endless carrier may be moved endlessly through the relatively high speed or transport zones 5 and 6 of the system. The endless carrier 55 is similar to the endless carirer 50 and is supported in like manner (see rotary component 51a in FIGURE 7) to co-extend with the latter carrier in an equidistantly spaced relation thereto and for the carriers to engage projections 17a and 18a respectively in the up transport or relatively high speed zone 5 and projections 17b and 18b respectively in the down transport or relatively high speed zone 6. The platforms 11 in the latter two zones are uniformly spaced apart vertically a distance b (see FIGURE 9) from unit to unit and this spacing not only is maintained by the endless carriers but by having the upper ends of the supports 21 and 22 of each of the elevator units abutting the platforms 11 of the adjacent elevator units. The latter relation prevails for a short while before the elevator units move into engagement with the endless carriers and for a short while after the units are disengaged from the endless carriers. While the units are engaged with the carriers they counterbalance each other on the opposite sides of the system, the load of the respective units engaged with the carriers being transmitted from one side of the system to the other side of the system by the carriers themselves.

The thrust means in FIGURES 6 to 9 for driving the elevator units circuitously while the units are engaged in counterbalance comprises a plurality of screws extending through the varying speed zones LH and HL. Thus, screw set 15' in FIGURE 6 has screws 15'a, 15'b, 15'c and 15'd through the several zones HL and LH of the system. Like screws are provided in a set 16' (not fully shown) and co-extend with those in the set 15'. The screws in the sets have like pitches throughout locations which are directly opposed in the sets and terminate having their opposite ends respectively in the corresponding low speed zones 3 and 4 and in the corresponding high speed zones 5 and 6 of the system, the pitches of the screws varying in the varying speed zones so as to decrease from the relatively high speed ends of the screws progressively to the low speed ends of the screws. Moreover, the pitches of the screws adjacent to the relatively high speed zones correspond to relatively high speed $V_H$ of the elevator unit 10 in the high speed zones and to relatively low speed $V_L$ of the elevator units 10 in the low speed zones and the system maintains substantially an equality of the ratio $c/b$ to the ratio $V_L/V_H$ hereinbefore mentioned with reference to FIGURES 1 to 5e, inclusive, and the related elevator units, their platforms and speeds of the units in the low and relatively high speed zones. Further, the difference in elevation between the platforms of the elevator units in the present embodiment varies in the varying speed zones from spacing b at the high speed ends of the varying speed zones to substantially zero at the low speed ends of the varying speed zones and in each of the latter zones a change in alignment of the platforms is achieved much in the same manner as hereinbefore set forth with reference to FIGURES 1 to 5e, inclusive.

The screws of set 15' are curved following the orbit of roller 17 on each of the elevator units 10 for engaging and driving this roller. Likewise, the companion screws in set 16' are curved in the orbit of roller 18 of each of the elevator units 10 for engaging and driving the latter roller. For purposes which will be explained more fully hereinafter each of the screws in sets 15' and 16' has a short extension which co-extends with the corresponding carriers 50 and 55 in the relatively high speed zones 5 and 6, the extensions being characterized by a substantially constant pitch corresponding to the relatively high speed $V_H$. Two such extensions 15'g and 15'f are shown in FIGURE 9 respectively on the screws 15'a and 15'd.

FIGURE 9 enables an understanding of advance of the elevator units 10 under the drive of the drive screws though only screws 15'd and 15'a are shown. It will be appreciated that there are counterpart screws in the set 16' acting in like manner. Accordingly, screw 15'd in engagement with rollers 17 of the elevator units advances these units upwardly from the low speed zone 3 in FIGURE 6 through the upwardly leading speed varying speed zone LH until the elevator units attain relatively high speed $V_H$ in the relatively high speed or transport zone 5. The screw 15'd continues the advance of the elevator units upwardly until rollers 17 of the units disengage the latter screw following engagement of projections 17a with the endless carrier 50. To promote the engagement, the substantially constant speed pitch extension 15'g advances the elevator unit in synchronism with the endless carrier 50. The thrust of screw 15'd is transmitted to the carrier 50 by reason of the contacting relations of the platforms 11 and the supports 21 and 22 of the elevator units. Carrier 50 meanwhile is in engagement with projections 17b in the transport or relatively high speed zone 6 and the units in the several relatively high speed zones accordingly counterbalance each other and relieve the drive means of load of the elevator units. Continued upward advance of the elevator units in FIGURE 9 brings about disengagement of prjoections 17a from the endless carrier 50 following engagement of the rollers 17 of the units with the drive screw 15'a. This disengagement is assisted by the substantially constant speed extension 15'f of the screw 15'a having the proper thrust to advance the associated elevator unit 10 in synchronism with the carrier 50. Drive accordingly is continued under the thrust of screw 15'a and eventually screws 15'b and 15'c act upon the units while projections 17b advance with the units downwardly through the relatively high speed zone 6, wherein projections 17b first are engaged at screw 15'b with the endless carrier 50 and then disengaged at screw 15'c. The companion screws in screw set 16' of course share in this action. The screws in sets 15' and 16' are driven preferably at an established constant speed by suitable motor means (not shown) and are synchronized to produce the desired action for driving the elevator units.

In certain embodiments of this invention, the elevator units are maintained continuously in engagement with the drive means throughout the circuit of the guide means not only in the relatively high speed or transport zones but in being advanced through the varying speed zones and thence through the low speed zones and the next varying speed zones in the system. For example, additional suitably mounted rotary low speed pitch screws 303 and 304 (FIGURE 10) extend between the adjacent low speed ends of pairs of the varying speed zones HL and LH and coact in a system which otherwise is similar to that of FIGURE 5. Accordingly the lower ends of screws 15b and 16b (see FIGURE 10a) are supplemented by screw 303 which occupies an intermediate underneath situation with respect to these screw ends and thence extends substantially horizontally rectilinearly through the low speed zone 3 and terminates in an intermediate situation with respect to the lower ends of screws 15a and 16a. Further, a suitably fixed track 300 having rails 300a and 300b co-extending on opposite sides of the screw 303 and parallel to the latter screw affords guidance for the elevator units 10 in the low speed zone 3. Screw 304 likewise is related to the upper ends of screws 15a and 16a by being disposed in an underneath underlying relation to these screw ends and extending substantially horizontally rectilinearly thence through the low speed zone 4 and terminating in an intermediate underlying situation with respect to the upper ends of screws 15b and 16b. A suitably mounted track 310 has its rails 310a and 310b on opposite sides of the screw 304 and slightly above and parallel to this screw.

The elevator units 10 are modified in the respect that they include on the underneath sides railway wheels 300c (see FIGURE 10c) suitably secured to the platforms 11 and engaging the rails of tracks 300 and 310 in following relation to these rails. Also, each of the elevator units 10 has a projection 17d situated on the underneath side of the corresponding platform 11 so as to engage in driven relation the screws 303 and 304 in the low speed zones 3 and 4. Screws 303 and 304 have a substantially constant low speed pitch for advancing the elevator units 10 through the low speed zones 3 and 4 at low speed $V_L$ hereinbefore referred to and the advancement thus provided is in the same circuitous direction of advance of the elevator units as that provided by the screws in sets 15 and 16, all so that substantial equality of the ratio $c/b$ to the ratio $V_L/V_H$ is preserved in the system. Any suitable motor means (not shown) is provided for rotating the screws in the system in the proper directions and the drive is such that the screws are synchronized to enable engagement and disengagement of the rollers 17 and 18 respectively with screws 15a and 15b and with screws 16a and 16b, and engagement and disengagement of projections 17d with screws 10f and 10g.

In FIGURE 10 it will be seen that the guides 24 are in two sections having lower ends 24a and 24b in low speed zone 3 and upper ends 24c and 24d in the low speed zone 4, the guides being interrupted in these zones. Likewise, it will be seen that slideway 26 is in two sections 26f and 26g respectively leading into and away from the low speed zone 3, the slideway 26 being interrupted in the low speed zone 3. The companion slideway 27 as shown in FIGURE 10a similarly has sections 27f and 27g terminating at opposite ends of the low speed zone 3 and which co-extend with the slideway 26. Further, slideway 33 is in two sections 33f and 33g respectively leading into and away from the low speed zone 4, the slideway 33 being interrupted in the low speed zone 4. The companion slideway 34 as shown in FIGURE 10b likewise has sections 34f and 34g terminating at opposite ends of the low speed zone 4 and the sections co-extend with the slideway 33. Guides 25 also are interrupted in the low speed zones and as shown in FIGURES 10a and 10b have ends 25a to 25d adjacent to the ends 24a to 24d of the guides 24.

In zone 3, the track 300 affords guidance for the elevator units 10 in the system, and screw 303 affords the propulsion while the elevator units are thus guided free of the guides 24 and 25 and the slideways 26 and 27. During movement of the elevator units into the low speed zone 3, screw 303 and screws 15b and 16b simultaneously engage each elevator unit for a short time as will be understood by noting the overextent of the screws in FIGURE 10a. Thus, rollers 17 and 18 and projection 17d are engaged with their respective screws; however, with continued travel the rollers 17 and 18 depart from the screws 15b and 16b and the elevator unit then is propelled by having projection 17d in driven engagement with the screw 303. At the other end of the low speed zone 3 the rollers 17 and 18 come into engagement with the respective screws 15a and 16a and for a short while thereafter the projection 17d remains in driven engagement with screw 303. As travel proceeds the projection 17d departs from the screw 303 and drive is continued by means of screws 15a and 16a in engagement with the rollers 17 and 18. While the elevator units are driven by the screws 15a and 16a the units are guided by the corresponding sections of the slideways 26, 27, 33 and 34 and by the corresponding sections of the guides 24 and 25. This form of guidance is discontinued in favor of guidance by tracks 303 and 304 in the low speed zones. The screw 304 and screw 310 situated in zone 4 receive the units (FIGURE 10b) from screws 15a and 16a, slideway sections 33f and 34f and ends 24c and 25c of the guides 24 and 25, and drive and guide the units to the screws 15b and 16b, whereupon the latter screws take over the propulsion with the units engaged with the slideway sections 33g and 34g and the guides 24 and 25 beyond ends 24d and 25d, and thus the units are delivered back to the low speed zone 3. If desired, in the latter arrangement a substantially uniform spacing $c$ of the midpoints of the similar breadths $a$ of the units 10 may be effectively maintained in the low speed zones 3 and 4 by the drive and guide means without the elevator units necessarily being in contact with each other (see FIGURE 10d) in these zones, and yet the substantially uniform spacing $b$ of the platforms 11 in the relatively high speed zones 5 and 6 can also be effectively maintained by the drive and guide means at value greater than the spacing $c$, this by adhering to the ration of $c/b$ being substantially equal to the ratio of $V_L/V_H$. A digression from the ratio even is tolerated under such circumstances as where the pitch of screws 15a, 15b, 16a and 16b vary in one of the high speed zones 5 and 6 from the same minimum $V_H$ through maximum $V_H$ and back to the same minimum $V_H$ between adjacent varying speed zones LH and HL and the spacing $b$ between the units themselves is sufficiently large initially to tolerate such digression. Under certain circumstances low speed screws having varying low speed pitches may be substituted for the screws 303 and 304, the speeds thus represented for the elevator units in the first series of positions being a low speed which varies within a range which is lower than the relatively high speeds of the units in the second series of positions.

From the foregoing it will be appreciated that in certain installations in accordance with the present invention, as where the guide means and movements of the elevator units are consistent with configuration and direction of arrows in FIGURE 11, the sides of the platforms leading in the breadthwise movement of the elevator units past landing 62 are the direct opposites of the sides of the platforms which lead when the elevator units travel past the landing 63. This invention lends itself as well, however, to alternatives which for example provide guidance for the elevator units in the particular system, still in accordance with the principles hereinbefore described, to have the same sides of their platforms lead in the breadthwise movement of the units past both of the landings 62 and 63. In the embodiment of FIGURES 12 and 13, the guide means, as schematically represented by circuit lines, is helically twisted in the relatively high speed or transport zones through half a turn to impart to the elevator units and their platforms a 180° turning movement horizontally about their vertical axes so that the same sides of the platforms do in fact lead in the movement past both of the landings 62 and 63 when the units are driven and guided circuitously in the direction indicated by the arrows in FIGURE 11. The particular drive means, as for example screws (not shown), may also extend helically, if desired, through the transport or relatively high speed zones for maintaining direct driving engagement with the several elevator units in these zones for the units to be advanced at relatively high speed $V_H$. The helically twisted guide means, therefore, not only directs the same sides of the platforms to lead past both of the landings but in certain instances installations of this character are highly desirable for turning the elevator units so that the same entrances of these units may indeed serve 180° opposed fixed entrance locations, one corresponding to each of the landings 62 and 63.

Consistent with a further alternative, the guide means in the varying speed transport apparatus (see FIGURE 14) may have its up and down transport sides inclined to cross between landings 62 and 63 without meeting in the vicinity 64 of crossing. In this arrangement the guides and slideways of the guide means still are situated to sustain the platforms in the elevator units substantially horizontal while the units are being advanced through both of the up and down transport zones as well as through the other zones of the system as before. This particular arrangement also enables the same sides of the platforms to lead in breadthwise movement of the units past both of the landings 62 and 63. Another manner in which the latter objective is again achieved involves dividing the lower landing into two parts 62a and 62b and giving to the guide means in the system the shape shown in FIGURE 15. Thus, a return path 65 is defined beneath the landings 62a and 62b along which the platforms travel upside down. This return path is useless for transport but offers worthwhile benefits such as in instances where different landings and corresponding first series of positions through which the units advance are needed as at the same level in the system.

Varying speed apparatus in accordance with the present invention also lends itself to modifications wherein more than two levels are successively served by the elevator units in circuitous system. In the guide arrangement diagrammatically illustrated in FIGURE 16, the circuitous guide means not only extends past two terminal landings, one of these being a lower landing 62 and the other being an upper landing 63, but past intermediate landings 67a, 67b, 68a and 68b. The guide means thus extends substantially horizontally rectilinearly past each of the several landings to guide the elevator units in the system for being driven at low speed through first series of positions adjacent to each of the landings. The intermediate landings 67a and 68a are on the up side of the system while the intermediate landings 67b and 68b are on the down side of the system. When the lower landing 62 is located inside the closed loop of the guide means with the intermediate landings outside, 180° turns 69 and 70 are for example provided in the upward and downward transport zones respectively between the lower landing and the two intermediate landings immediately above, if the same sides of the platforms of the elevator units in the system are to lead in passing all of the landings of the system. As shown in FIGURE 13, the two 180° turns 69 and 70 are sometimes replaced and with the result that the same sides of the platforms again lead throughout movement of the elevator units past the landings in the system. A similar result is also obtained by dividing the lower landing of the two parts 62a and 62b (see FIGURE 14) arranged outside the closed loop and beneath which the guide means forms a return loop 65.

Where the varying speed transport apparatus in accordance with the present invention is provided for such purposes as transporting people, each elevator unit in the system advantageously not only includes a platform but a passenger enclosure connected with the platform and extending above the perimeter of the platform, at least a portion of the enclosure being movably mounted in the unit for being moved with respect to the platform between open and closed positions to open and close the unit. Thus, for example, in the embodiment of FIGURES 19 and 20 each elevator unit 100 in the system includes a platform 101 which remains substantially horizontal in the path of travel which is used for transport as hereinbefore stated with reference to foregoing embodiments, and each unit also includes a housing 102. The heighth of the housing is adequate for a person to stand upright on the platform 101, the housing and platform together forming a cabin of which the platform is the floor. In further detail, the housing in the present embodiment includes a roof or top 107 having sections 107a and 107b. Also the housing is characterized by having a first pair of opposed sides 103 and 104 which are transverse to breadth a of the unit and a second pair of opposed sides 105 and 106 extending transversely of the first pair of sides between the latter pair of sides. Side 103 is formed having two upright sections or panels 103a and 103b and similarly side 104 has two upright sections or panels 104a and 104b. There are windows 108a in the panels of opposed sides 103 and 104 and hand rails 109 are disposed inside the elevator units on the sides 105 and 106. Panels 103a and 104a are rigid with the top section 107a and these panels and top section thus form a movable unitary housing portion 110, whereas the panels 103b and 104b are rigid with the top section 107b and the latter panels and roof section and accordingly form a movable unitary housing portion 111. All four panels 103a, 103b, 104a and 104b are equipped with slides having T cross section which are laterally interlocked and longitudinally movable in guideways also of T cross section in the platform 101. The slides and guideways thus form longitudinally movable laterally interlocking connections S1 and S2 between the movable unitary housing portions 110 and 111 and the platform, for these portions of the housing to be moved horizontally outwardly from the platform away from each other to open position and back to closed position all while the movable unitary housing portions remain engaged with the platform. This movement is also guidedly tolerated by interfitting slides and guideways S5 of T cross section which respectively are components on the side 105 and of panels 103a and 104a, and by interfitting slides and guideways S6 of T cross section which respectively are components of sides 106 and of panels 103b and 104b. The outward movement of unitary housing portions 110 and 111 is arrested in the open position of these portions by inside stops 110a and 111a which are components of corresponding innermost ends of the side panels and top sections of the movable housing portions, and more particularly abutment is had against the corresponding inside surfaces of the sides 105 and 106 when the movable housing portions are in open position.

The drive and guide means and tolerances utilized in moving a plurality of the elevator units 100 circuitously in transport system are quite similar to the arrangement hereinbefore described with reference to FIGURES 10, 10a, 10b, 10c and 10d and so the ensuing description will at the outset allocate these means in the environment of a system of endlessly succeeding elevator units 100 without repeating each and every detail relating to the tolerances and the drive and guide means. Accordingly, the housing side 106 supports centrally adjacent to the upper end thereof an outwardly projecting guide follower and driven component 19' having a roller 17', and adjacent to the lower end of this side, and opposite edges thereof, are outwardly projecting fingers 28' and 32'. Fingers 29' and 31', and guide follower and driven component 20' having a roller 18', are outwardly projecting from the housing side 105 in positions corresponding to those of their aforementioned counterparts on the housing side 106. Rollers 17' and 18' have a common axis which is parallel to the platform 101 and transverse to breadth $a$ of the unit 100. The underneath side of each elevator unit platform 101 is arranged in accordance with the structure illustrated in FIGURE 10c and thus supports railway wheels 300c and a centrally disposed projection 17d. The wheels are on axes transverse to breadth $a$ of the unit and these same axes are substantially parallel to the longitudinal axes of the slide and guideway connections S1 and S2 between the movable housing portions 110 and 111 and the platform 101. The wheels 300c engage tracks in the low speed zones and are driven by supplemental constant low speed pitch drive screws in the system cooperating with the tracks and drivingly engaging the projection 17d of each unit.

Each elevator unit 100 has cam rail following rollers respectively affixed to the housing portions 110 and 111 for the elevator unit to have these housing portions driven to and from open and closed positions relative to the platform 101. The housing portion 106 supports at the outer end a bracket mounting 115 connected at the ends to panels 103b and 104b while housing portion 110 includes a bracket mounting 116 connected to the outer edges of panels 103a and 104a. These bracket mountings are in intermediate positions on the housing in the vertical direction of the housing. Bracket mounting 115, centrally of its length, supports an outwardly projecting bracket 117 on the outer end of which is mounted a vertically extending shaft 118 having rotatably thereon upper and lower rollers 119 for engaging a cam rail 123 (see FIGURES 21 and 22). Likewise, bracket mounting 116, centrally of its length, has an outwardly projecting bracket 120 which carries on the outer end thereof a vertical shaft 121 rotatably supporting upper and lower rollers 122 which are adapted to engage a cam rail 124.

In FIGURES 21 and 22 the lower portion of a circuitous system of elevator units 100 is represented with the elevator units approaching, occupying and leaving low speed zone 3 and in the environs including the related varying speed zones HL and LH and the lower portions of up and down transport or high speed zones. The cam rails 123 and 124 co-extend throughout the majority of the length of the low speed zone 3 in the system and have substantially parallel end portions 123a and 124a at elevator unit entering locations in the low speed zone and substantially parallel end portions 123b and 124b at elevator unit leaving locations in the low speed zone. Portions 123a and 124a are spaced the same distance apart as portions 123b and 124b and the spacing corresponds to closed positions of the movable portions 110 and 111 of the elevator units. Further, the cam rails 123 and 124 comprise intermediate substantially parallel portions 123e and 124e spaced apart a distance corresponding to full open position of the movable portions 110 and 111 of the elevator units. These intermediate cam rail portions extend lengthwise a distance within which a plurality of the elevator units 100 are located side by side in the system thus making it possible for a series of the elevator units to have their housing portions 110 and 111 simultaneously fully open. Between the cam rail portions 123a and 124a and the cam rail portions 123e and 124e are transitional cam rail portions 123c and 124c respectively interconnecting the corresponding parallel portions of the cam rail. The transitional portions 123c and 124c extend along paths which correspond to the elevator unit housing portions 110 and 111 being in positions progressing from closed position to fully open position. Interconnecting the parallel cam rail portions 123e and 124e and 123b and 124b respectively are transitional cam rail portions 123d and 124d. The latter portions extend along paths which correspond to movement of the movable housing portions 110 and 111 from fully open position to closed position.

The elevator units 100 in mode of operation similar to that disclosed with reference to FIGURES 10, 10a, 10b and 10c or 10d, descend under the drive of screws 15b and 16b through the varying speed zone HL noted in FIGURE 21 and have their projections 17d on the underneath sides of the units engage the substantially constant low speed pitch drive screw 303 which accordingly takes over for propelling the elevator units through the low speed zone while guide follower and driven components 19' and 20' escape from the guides 24 and 25 and have their rollers 17' and 18' move free of screws 15b and 16b. Fingers 32' and 31' on the units also move free of the slideway portions 26f and 27f when the railway wheels 303c of the units engage the rails of track 300 in the low speed zone. Meanwhile, cam rollers 119 and 122 of the units approach portions 123a and 124a of cam rails in the low speed zone. Continued movement of the elevator units 100 through the low speed zone, however, brings the cam following rollers 119 and 122 into contact with the transitional portions 123c and 124c of the cam rails, and the movable housing portions 110 and 111 engaged with the cam rollers in this position begin to move horizontally apart toward the fully open position which is attained as the rollers advance into positions wherein they follow portions 123e and 124e of the cam rails. The latter portions of the cam rails, being parallel, enable a plurality of the elevator units 100 to remain in fully open position in breadth to each other while the units are traveling. As the elevator units further are advanced by operation of screw 303 the cam rollers 119 and 122 are brought into engagement with the transitional portions 123d and 124d of the cam rails and in these positions the housing portions 110 and 111 of the elevator units move horizontally toward each other and attain fully closed position, whereupon the elevator units have their rollers 119 and 122 move into engagement with the cam rail portions 123b and 124b. Following this, the cam rollers are advanced from the cam rails and in mode of operation similar to that disclosed with reference to FIGURES 10, 10a, 10b and 10c or 10d the drive and guide following components 19' and 20' engage ends 24c and 25c of the guides 24 and 25, rollers 17' and 18' engage screws 15a and 16a, and fingers 28' and 29' engage the guideway sections 26g and 27g for the units to be thus propelled and guided. In the upward advance of the units by drive of screws 15a and 16a wheels 300c are lifted from the track 300, and projections 17d are lifted from screw 303.

Means therefore are provided for controlling positions of the passenger enclosures produced by the housings 102 of the elevator units, whereby the enclosures open and close with respect to the platforms when the elevator units reach a loading and unloading region in the system.

In the low speed zone 3 the opened elevator units 100 advantageously are in sufficient proximity to each other to form a moving passage or corridor 125 having the sides 105 and 106 of the units as components of moving walls and the platforms 101 of the units as components of a moving floor. This corridor as shown in FIGURE 23 is accessible endwise, for example by means of a stairway 127 extending upwardly from the landing 126 under which the platforms 101 travel. The open movable portions 110 and 111 of the elevator units meanwhile are driven through hollow partitions 128 and 129 which are located in the prolongation of the sides 105 and 106 of the corridor. Suitable hand rails 130 are mounted on partitions 128 and 129 along the landing 126 and extend upward along the stairway 127 so as to lead away from the hand rails 109 in the elevator units. Therefore, it will readily be realized that the present embodiment enables persons in the elevator units to depart from the platforms 101 in the low speed zone 3 while others of the units in the system are advancing into the zone in the direction of arrow 45 in FIGURE 23. For passengers to move laterally away from platforms 101 in the moving corridor in zone 3 it suffices to have the stairway lead upwardly from the platforms to an elevation above the tops of those units which are forming the corridor. A similar 180° opposite stairway is usually introduced for passengers to have access to an extension of corridor 125 formed by the units 100 adjacent to the up transport side of the system, as can readily be visualized in FIGURE 23 by assuming for the moment that the elevator units 110 are moving in the up direction indicated by the dotted line arrow 47.

The immediately foregoing description has been directed to low speed zone 3 in a lower region of the system and the related landing 126; however, it will be clearly understood that similar arrangements also apply to at least an additional landing at an upper level linked by the circuitous system with the lower level and landing 126. The elevator units 100 ascend to the upper level, have their movable housing portions 110 and 111 progressively moved to fully open position from closed position, remain open along the landing, such as in proximity thereto producing a moving corridor, and then have their movable housing portions closed for the descending movement of the elevator units. The drive and guide means at the upper level accordingly may be similar to that employed at the lower level. In the event that the elevator housings are to be opened and closed at an intermediate level to which the elevator units ascend and from which the elevator units ascend or to and from which the elevator units descend (see FIGURE 16) similar cam rails for opening and closing the elevator units in these regions also are provided. Other arrangements with or without cam rails and cam rollers for opening and closing the elevator units when the units are being driven and guided of course may be availed upon still in accordance with the present invention. In certain instances, for example, the housing portions 110 and 111 may be suitably retained to undergo inversion in traveling a loop such as the loop 65 in FIGURE 15. In which event, the housing portions 110 and 111 illustratively are opened as the elevator units move in descent toward landing 62b and may remain open through inversion until the units have moved past landing 62a, the movable housing portions then being closed for the ascending movement of the units.

The present invention is also directed to varying speed transport systems wherein at least a movable portion of each elevator unit passenger enclosure in being controlled by position control means for opening and closing the unit to a passenger is adapted to undergo vertical movement in traveling between open and closed positions with respect to a platform of the unit. In the illustrative embodiment represented in FIGURES 24 to 27 a varying speed transport system has an endless succession of similar elevator units 100 therein and the units are driven and guided the same as in the immediately preceding embodiment disclosed herein and as before have movable elevator housing portions 110 and 111 and the associated sides 105 and 106 on platforms 101; however, side 105 of the housing is further characterized by being slidably engaged with the corresponding end of the platform by means of slides and guideways which produce slidable connections S7 having T cross section and vertical longitudinal direction for vertical longitudinal movement of the side 105 effected after the movable housing portions have engaged the cam rails 123 and 124 on entering the low speed zone 3 and have moved apart to their horizontally open positions. Moreover, the stops 110a are adapted to be displaced horizontally outwardly in the horizontal movement of housing portion 110 until the horizontal slides and guideways in connections S1 are disengaged and portion 110 is free to move vertically clear of the corresponding end of the platform 101, the latter movement being guided by the slidable connections S7 and arrested in the lowermost vertical position by the top section 107a.

As shown in FIGURES 25 and 26, the cam rail 124 in at least one of the low speed zones of the system, such as zone 3, is without an intermediate portion and in this region of omission of the cam rail the rollers 122 are free of the rail for the horizontally open housing portion 110 and side 105 to be moved vertically, though the cam rail 123 is continuous as before and rail 124 still has portions 124a, 124c, 124d and 124b to engage rollers 119 and 122 as before for moving the housing portions 110 and 111 horizontally between the closed positions and the horizontally open positions.

Sides 105 of the elevator units 100 have downward projections 105a centrally of their lower edges for cooperating with a lowering and lifting mechanism in the corresponding low speed zone. For lowering the sides 105, and accordingly the movable housing portions 110, the lowering and lifting mechanism includes an endless lowering conveyor such as an endless chain 131 having an upper sprocket 133 and a lower sprocket 134. This conveyor is inclined downwardly and forwardly in the direction of advance of the elevator units 100 and engages each of the projections 105a in sequence as they advanced by action of the drive screw 303 upon projections 17d immediately after the movable housing portions 110 and 111 attain their horizontally open positions and the corresponding cam roller 122 has advanced from portion 124c of the cam rail 124. The engagement of projection 105a with chain 131 prevails until the corresponding side 105 is substantially fully lowered vertically with respect to platform 101 of the unit. Also an endless lifting conveyor such as endless chain 132 on upper sprocket 135 and lower sprocket 136 is provided for sequentially engaging the projections 105a and raising the sides 105 from their lowermost positions to their uppermost positions with respect to platform 101 of the unit, this action likewise being effective for raising the associated housing portions 110 to their uppermost positions, whereupon projections 105a are disengaged from the lifting chain and the movable housing portions 110 and 111 are forced horizontally into closed positions with respect to the related platform 101 by action of the cam rail 123 and cam rail portion 124d. Closing of the movable portion 110 re-engages the horizontal components of connections S1, and the horizontally slidable connections S5 between the side 105 and portion 110 lock the side 105 against moving vertically.

The lower ends of the chains 131 and 132 are spaced apart a distance which considerably exceeds the length of the landing 126' under which the platforms 101 are being moved in the transport system, thus making platforms 101 available at both ends of the landing for passenger traffic to and from the platforms in the system. The conveyors 131 and 132 are driven by suitable motor means, not shown, and are synchronized with the horizontal advancement of projections 105a by screw 303, so that these projections are engaged by the conveyors for lifting and lowering the sides 105 and the associated movable housing portion 110. The speed at which the conveyors 131 and 132 are driven has a horizontal component which is equal to the driven speed of each elevator unit 100 on track 300 and accordingly the drive speed of the substantially constant low speed pitch drive screw 303, the advance of the top flight of chain 131 being in a downward direction and the advance of the top flight of chain 132 being in the upward direction as indicated by arrows in FIGURE 25.

By maintaining close formation of the units 100 in the low speed zone, such as zone 3 in FIGURE 27, and through having the housing portions 110 and side portions 105 vertically operable, as desired, a moving corridor 125 of which the platforms 101 and sides 105 and 106 are respectively aligned as corridor floor and wall components is laterally accessible through one of its walls at platform 126'. The corridor has a loading section 125a and an unloading section 125b at opposite ends of the same landing under which the platforms travel. Meanwhile, the sides 105 and their associated movable housing portions 110 are lowering adjacent to the unloading end of landing 126' through hollow partition 137 and at the loading end of the landing the movable housing portions 110 and sides 105 are rising within hollow partition 138. Further, it will be seen that movable housing portions 110 and 111 are being moved closed from their horizontally outermost positions beyond corridor section 125a while these same portions are being retracted horizontally outwardly from each other to their outermost horizontal positions as the elevator units 100 approach the moving corridor section 125b. The horizontally outwardly positioned movable housing portions 111 travel through a hollow partition 139 adjacent to the landing 126' and are not raised and lowered although in certain embodiments (see dotted lines in FIGURE 27) these portions of the housing and side portions 106 may also be raised and lowered such as through adding structure akin to that employed for raising and lowering the housing portions 110 and sides 105. The transport system links an additional landing or landings with the landing 126' and the elevator units are opened and closed at the additional landing or landings such as by further cam rails and lifting and lowering mechanism of the character already described which engage the corresponding movable portions of the housings of the units.

In still other embodiments in accordance with the present invention the elevator units each include at least one platform, and this platform and a top over the platform are members of a rigid frame including a generally C-configuration, the frame in this having as a member thereof a side which rigidly interconnects corresponding ends of the platform and top. In certain of these embodiments the C-shaped frame may additionally have members therefrom to and including at least another platform vertically spaced downwardly from the under side of the first platform and substantially parallel to the latter platform so that the rigid frame comprises members producing a generally E-configuration or a generally S-configuration of the framework insofar as it includes these members. The elevator units represented in FIGURES 28 to 34 fall into this general category for the unit 160 (see FIGURES 28 and 29) includes a platform 161, a roof or top 162 and a side 165 rigid with the platform and top so that members produce a rigid frame having a generally C-configuration, in which the platform 161 and top 162 are normally horizontally parallel and the interconnecting side 165 is normally substantially vertical for passengers to be transported standing upright in the elevator unit 160. A housing on the platform 161 for enclosing the inside of the elevator unit includes the top 162, a first pair of opposed sides 163 and 164, and further a second pair of opposed sides 165 and 166 extending transversely of the first pair of opposed sides between the latter pair of sides. One of the second pair of opposed sides, side 165 of the frame, serves as a back of the elevator unit 160, and the other of the second pair of opposed sides, side 166, includes two flexible portions 166a and 166b of the housing which meet each other centrally of the front of the elevator unit. These flexible portions extend respectively from forward portions 163a and 164a of the housing sides 163 and 164 for being moved between closed position and a rearward open position on the C-shaped frame. The last mentioned pair of opposed sides of the housing further include opposed rearward portions 163b and 164b which respectively overlap the forward portions 163a and 164a for the latter portions to be moved rearwardly relative to the rearward portions.

As will be understood from FIGURES 29 and 31, a U-shaped slot 161a adjacent to the perimeter of the platform 161 along sides 163, 164 and 166 of the housing leads downwardly from the upper face of the platform into a coextending guideway 170a which is laterally open to the interior of the platform. There is a corresponding U-shaped slot 162a leading upwardly from the under face of the top 162 into the coextending guideway 170b which is laterally open into the interior of the top. The slots and guideways accommodate the respective lower and upper ends of the flexible portions 166a and 166b of the housing side 166 and the opposed side portions 163a and 164a of the housing sides 163 and 164, for these housing portions to be moved lengthwise of the guideways and slots. Rearward portions 163b and 164b of the housing sides 163 and 164 are also slidably engaged with the platform and top for being moved between open and closed positions with respect to the C-shaped frame. For this purpose, guideway 161b on the platform, and extending from an intermediate front to back location along the platform and thence backward out the rear of the elevator unit, and a coextending guideway 162b on the top and open through the back of the top, accommodate the lower and upper ends of the housing side portion 163b. In like manner there are guideways 161c and 162c on the platform and top coextending from intermediate front to back locations along the elevator unit and thence backward through the rear of the unit. The guideways 161b and 162b and the guideways 161c and 162c are situated immediately inwardly from the corresponding legs of the U-shaped slots 161a and 162a and are parallel to these legs for the housing side portions 163a and 163b and the housing side portions 164a and 164b to overlap and clear each other in their corresponding sets in movement.

The rearward ends of 163b and 164b are interconnected by at least one cross member 194 (see FIGURES 29 and 30) and thus are movable in unison. In the region between the platform 161 and top 162 the forward ends of the flexible side portions 166a and 166b of the housing have inwardly directed flanges 171a and 171b (FIGURE 31) for meeting the forward ends of the rearward housing portions 163b and 164b and for sides 163, 164 and 166 then to move backward while so engaged. Also the forward housing portions 163a and 164a, adjacent to the rearward ends thereof, are equipped with inwardly directed flanges 173a and 173b which on forward movement meet outwardly directed flanges 172a and 172b, these being on the forward portions 163a and 164a of sides 163 and 164 contiguous to the forward ends of the latter portions. The rearward portions 163b and 164b thus may be drawn closed. The side portions 163a and 163b themselves are vertically interlocked and longitudinally slidably interconnected with each other by upper and lower sets of connectors 194 (FIGURE 31) which lengthwise extend longitudinally of these side portions. Each set comprises members 194a and 194b which in inverse order are one over the other in the upper and lower sets, the member 194a having a channel and the member 194b a flange horizontally slidably received in the channel. The respective members are mounted on the respective side portions 163a and 163b and extend horizontally for about the full length of the corresponding side portion so that the members in the sets remain engaged at ends whether the elevator unit 160 is open or closed. Side portions 164a and 164b are likewise interconnected by corresponding upper and lower sets of connectors 194.

The housing portions 163, 164 and 166 are adapted to have their positions controlled while a plurality of the elevator units 160 are being driven and guided circuitously in accordance with relations between units and speeds as previously described herein. The movable housing portions are combined with positioning means in the varying speed transport apparatus for the related units to be opened and closed. As shown in FIGURE 30, each elevator unit is equipped with a thrust transmission 173 having a power input gear 174 outside the platform 161 in an intermediate position along the forward edge of the platform. A shaft 175 supporting the gear 174 to rotate therewith is suitably journaled on the platform so as to have an axis substantially parallel with the plane of the platform. Shaft 175, on its inner end, forms the input of an L-gear box 176 providing an output shaft 177 which in turn drivingly supports a sprocket 178 inside the platform 161 on an axis substantially normal to the plane of the platform. This sprocket is associated with a plurality of supplemental sprockets 179 to 183, suitably journaled inside the platform and on axes substantially normal to the plane of the platform, and with the aid of the supplemental sprockets the sprocket 178 supports an endless chain which has flights coextending with the U-shaped guideway 170a adjacent to the laterally open side of this guideway. Further, the endless chain has portions which effect an out of contact crossing 185 so that the flights extending from sprocket 178 and thence to sprockets 179 and 180 and the flights extending from sprocket 181 and thence to sprockets 182 and 183 simultaneously have opposite directions of movement between sprockets 178 and 179 and sprockets 181 and 182, and like directions of movement between sprockets 179 and 180 and sprockets 182 and 183 for either of opposite directions of rotation of the power input gear 174 of the transmission. A corresponding like directed chain 184a is provided on the interior of the top 162 of the elevator unit and is carried on sprockets 178a to 183a (not fully shown) so as to be adjacent to the laterally open side of guideway 170b. Power input from gear 174 is transmitted from sprocket 183 in the platform to sprocket 183a in the top by means of an interconnecting shaft 186 which is rotatable with these sprockets. All of the other sprockets which carry the endless chain 184a may thus be idler sprockets.

Endless chain 184 includes a plurality of equi-distantly spaced teeth 187, throughout lengths thereof which in the closed position of the elevator unit housing extend from sprocket 178 and thence to sprockets 179 and 180, and from sprocket 181 thence to sprockets 182 and 183. Chain 184a has like disposed teeth 187a. The teeth on chains 184 and 184a are received in apertures 188 and 188a respectively in the lower and upper margins of the housing side portions 163a, 164a, 166a and 166b while these portions are driven between closed and open positions in response to movement of the corresponding chains.

The instant embodiment further involves having the platforms 161 equipped on the underneath side with wheels 300c which are on axes which are transverse to breadth a of the elevator unit 160 and to the corresponding side wall 165 of the C-shaped frame. Also the under side of each elevator unit has a downwardly projecting, centrally disposed component 17'd for the unit to be driven in the circuitous system. Further, each unit carries driven and guided members 19' and 20' and their included rollers 17' and 18' on opposite ends of the top 162, centrally of these ends to engage pairs of guide members 24 and 25 and screws respectively as hereinbefore described. In a plane a short distance above the power input gear 174 of the transmission 173 and on opposite frontal sides of the platform 161 are fingers 29' and 31'. On the rear edge of the platform and projecting outwardly adjacent to the rear corners of the platform are fingers 28' and 32'. The fingers engage slideways in the circuitous system and cooperate in a manner previously explained.

On referring to the schematic views of FIGURES 33 and 34 it will be understood that the elevator units 160 do lend themselves to circuitous travel while guided and driven substantially in the same manner as the elevator units of circuitous system of FIGURES 10, 10a 10b and 10c or 10d. The units 160, however, open and close on three of their sides and yet accomplish this by horizontal operation of the housing portions 163, 164 and 166. Power for the operation is put into the transmission 173 of each unit by the associated gear 174 and its engagement with racks 190 and 191 in each of the low speed zones of the circuitous system. As shown in FIGURE 33 the elevator units 160 on the down relatively high speed side of the system are approaching the varying speed zone HL while the platforms 161 are maintained substantially parallel to each other at distance b apart by means of their rollers 17' and 18', screws 15b and 16b, fingers 31', 32', guides 24 and 25 and slideways 26f and 27f. The elevator units 160 thence move through the varying speed zone HL, and into the lower level low speed zone 3 wherein horizontal movement of the units then continues by having the foregoing guiding action replaced by engagement of the wheels 300c of the units with the guide rails of track 300. The low speed propulsion is effected by the substantially constant pitch screw 303 in engagement with projections 17'd of the units and which bridges the distance between screws 16b and 16a as well as the distance between companion screws 15b and 15a shown in schematic view in FIGURE 34. The advance of each elevator unit 160 in the latter manner brings transmission gear 174 into contact with upwardly facing rack 190 suitably fixed in the path of the gear along side the platform of the unit. Gear 174 on initial contact with the rack has position in the circuitous system wherein the movable housing side portions are closed and are about to be opened. Rotation of the gear with continued advance of the elevator unit 160 under drive of screw 303 produces movement of chains 184 and 184a respectively in the platform and in the top of the unit whereby engagement of teeth 187 and 187a in the apertures 188 and 188a causes retraction of the flexible side wall sections 166a and 166b conjointly with the housing side wall portions 163a and 164a until flanges 171a and 171b come into abutment with the respective flanges 172a and 172b on the rearward side portions 163b and 164b of the housing. This accordingly adds to the movement the latter two portions of the side 163 and 164 under the drive of the chains and meanwhile the chain teeth are escaping adjacent to the rear of the platform from the apertures 188 and 188a. This action continues until pins 168 and 169 (FIGURE 31) on the forward ends of the housing side wall portions 163b and 164b are stopped by engagement with the rear of the unit, this engagement corresponding to terminated engagement of the transmission gear 174 with rack 190 in the line of advance of the unit through the low speed zone 3. Before the thus opened elevator units are closed a series of these units are maintained open in the low speed zone beyond the rack 190 and in this region the platforms 161 of the adjacent units lie in a common plane and form components of a continuously moving corridor floor having low velocity. The tops 162 and rear sides 165 of these same units form components of a continuously moving ceiling and back wall of the corridor. With the movable portions of the housing thus retracted the C-shaped frames of the units accordingly are highly effective for producing the longitudinal corridor extending in breadth a of the immediate units and which is laterally accessible. Further advance of each unit in the latter condition brings engagement of the transmission gear 174 with the upwardly facing rack 191 and the gear is given a reversed rotation by virtue of the units being driven in the low speed zone of the circuitous system by screw 303 in engagement with the platform projections 17'd. This reversed rotation prompts reversed directional movements of the chains 184 and 184a whereby the teeth 188 and 188a of these chains progressively re-enter the apertures 188 and 188a in the flexible side portions 166a and 166b and in side portions 163a and 164a. As these portions move forwardly in the unit, flanges 173a and 173b advance into engagement with the forward flanges 172a and 172b of the housing side portions 163b and 164b which then join the forward movement until the elevator housing is closed by having flanges 171a and 171b come substantially into abutment with each other centrally in the front of the unit. At this point the elevator unit has just had its transmission gear 174 depart from engagement from the rack 191. Drive of the unit is thereafter taken over by screws 15a and 16a in engagement with guides 24b and 25b and engagement with follower means 19' and 20' the rollers 17' and 18' and guidance of the units by means of the slideways 25g and 26g and the associated platform fingers is resumed as in the manner of FIGURES 10, 10a, 10b, and 10c or 10d. A similar drive and opening and closing arrangement to the one just disclosed with reference to the lower level low speed zone may of course be utilized at another landing or landings served by the transport system.

The present invention further lends itself to practices wherein a plurality of vertically spaced platforms occur in each of an endless succession of elevator units in varying speed transport apparatus having drive and guide means as of the character hereinbefore described with reference to the units in FIGURES 28 to 34. An embodiment involving the principle of having a plurality of platforms in each elevator unit of the circuitous system is represented in FIGURES 35, 36 and 37, wherein it will be understood that each of similar elevator units 260 in an endless succession of these elevator units has a rigid frame including a platform 261, a top 262 and an interconnecting side 265 which introduce a generally C-shape in the frame. An extension 265a of side 265 rigidly interconnects supplemental platform 261a with the platform 261, thus introducing a generally E-configuration wherein the platforms 261 and 261a and top 262 are substantially parallel to each other cantilevered off the side 265 and its extension 265a in the rigid frame. Further, there is a supplemental platform 261b extending substantially parallel to the other platforms of the unit and rigidly connected as a cantilever in the frame by side extension 265b. Platforms 261, 261a and 261b are vertically aligned with each other directly under the top 262 of the unit. Platform 261 is spaced from the top 262 far enough to afford standing room for passengers while platforms 261a and 261b are spaced from each other and from platform 261 also far enough for passengers to have standing room. These platforms of the units 260 and tops of the units are of about the same breadth as the units and are similarly situated in the units of the varying speed transport system, the platforms in each situation in the units being members of a corresponding group for reasons which will be explained hereinafter.

A housing for the platforms in the unit 260 includes the side 265 and its extensions 265a and 265b for a back which cooperates with top 262, the latter also being a component of the housing. Movable sides 263, 264 and 266 of the housing have upper and lower edges in slidable connection respectively with top 262 and the platform 261 and close off the related passenger space between the latter two members. Likewise, the space between platforms 261 and 261a is closed off by movable housing portions 263', 264' and 266' while the passenger space between platforms 261a and 261b is closed off by the movable housing portions 263", 264" and 266". The movable housing portions situated between platforms 261, 261a and 261b have upper and lower edges slidably engaged with the corresponding ones of these platforms and are movable with respect to extensions 265a and 265b between open and closed positions just as are the side portions 263, 264 and 266 movable between open and closed positions with respect to the side portion 265.

The movable housing portions 263, 264 and 266 are constructed and operated in the system much in the same manner as are the comparable housing components in the embodiment of FIGURES 28 to 34. The set of movable housing portions 263', 264' and 266' and the other set of movable housing portions 263", 264" and 266" are similar to the housing portions in set 263, 264 and 266 and have open and closed positions corresponding to those of the latter set. Each unit 260 preferably includes means interconnecting the movable housing portions of the sets for the passenger spaces in each unit to be simultaneously opened and simultaneously closed. Such coordinated action is for example accomplished by a transmission system which includes chains of the character hereinbefore set forth engaging the movable housing portions of the unit inside the top 262 and inside each of the several platforms, and which further includes an interconnecting drive shaft or drive shafts between sprockets supporting these chains and having power input through gear 174' situated at the front of platform 261b. The top 262 of each unit supports at opposite ends thereof rollers 17' and 18' in the driven and guide following members 19' and 20' for the same purpose as set forth with reference to the embodiment of FIGURES 28 to 34 and also the lower platform 261b has fingers 28', 29', 31' and 32' for the unit to be guided. Still further, the lower platform 261b is equipped with an extension 17'd and wheels 300c for being driven and guided in the low speed zones in a manner hereinbefore set forth.

Referring now more particularly to FIGURE 37, the elevator units 260 are shown diagrammatically to be in endless succession, and in the low speed zone 3 and extending into the ascending or up side of the system, merely the frames of the units are indicated to represent the units and present relative dispositions of the several platforms. In the low speed zones 3 and 4 the units as guided and driven breadthwise at low speed through first series of positions have their platforms within each group in the first series of positions substantially horizontal. Thus, platforms 261, 261a and 261b are in corresponding groups and are in alignment with each other in these corresponding groups. Where, as preferred, the units are driven each at substantially the same low speed $V_L$ through the first series of positions, and the midpoints $m$ of the breadths $a$ of the units in these positions are spaced apart substantially the same distance $c$ from unit to unit, the distance $c$ advantageously is about equal to breadth $a$ of the unit and its platforms. In the relatively high speed zones 5 and 6 the units 260 as driven and guided each at relatively high speed through second series of positions have the platforms of each of the units in the second series of positions at different elevations and substantially horizontal. Where the units are driven each at substantially the same relatively high speed $V_H$ through zones 5 and 6, as preferred, the platforms within each group differ in elevation with respect to each other from unit to unit by about the same distance $b$, which appreciably exceeds the distance $c$ applying to the first series of positions. The distance $b$ may for example exceed heighth of the unit or be substantially equal to the heighth of the unit such as wherein the latter instance the units are in contact with each other through the second series of positions. As driven and guided through the varying speed zones, the units 260 move through the third series of positions vertically and breadthwise while having their axes transverse to breadth substantially parallel and their platforms substantially horizontal. The third series of positions are in continuity with the first and second series of positions in the adjacent low and relatively high speed zones and speed of the units in the third series of positions progressively increases from low speed of the units in the first series of positions adjacent to the low speed end of the varying speed zone thence to the relatively high speed of the units in the second series of positions adjacent to the relatively high speed end of the varying speed zone. The units 260 in the third series of positions are stepped from overlying to outlying relation to each other from the adjacent relatively high speed zone to the adjacent low speed zone and the platforms within each group in the units likewise are stepped from unit to unit with difference in elevation of the platforms in each group being a major difference adjacent to the high speed end of the varying speed zone and varying through decreasing differences $x^4$, $x^3$ and $x^2$ to a minor difference $x^1$ in elevation of the platforms in the group adjacent to the low speed end of the varying speed zone. These variances are shown with reference to the group of platforms 261 but likewise apply to the group of platforms 261a and to the group of platforms 261b.

FIGURE 38 is a fragmentary perspective representation of portions of the elevator units 260 and in particular is focused upon first series of positions of platforms 261 and 261a in the low speed zone 3. It will be seen that access to the platforms can be had laterally of the direction of movement of the related elevator units and that more particularly the platforms 261 and 261a are accessible from the same station at different local levels in the circuitous system. The local levels corresponding to platforms 261 and 261a respectively may for example be those of adjacent floors of a building. The tops 262, sides 265 and platforms 261 afford correspondingly aligned portions of one continuously moving corridor of the system while platforms 261 and 261a together with interconnecting side 265a form continuously moving correspondingly aligned portions of a second corridor which is advancing at the same low speed as the first corridor directly beneath the first corridor. Landings 270 and 271 respectively extend over platforms 261 and 261a and have portions serving passenger traffic from the incoming platforms and to the outgoing platforms. The incoming platforms in these regions move under the landings and become outgoing platforms. Platforms 261b and their corresponding still lower local level in the station are not shown in FIGURE 38; however, platforms 261b are in accordance with positions represented in FIGURE 37 and are in a moving corridor formed by the units which is accessible in much the same manner as the corridors at the upper local levels. The circuitous system links an upper station in the low speed zone 4 (see FIGURE 37) similar to the lower station in zone 3, the upper station also having upper and lower local levels within the station corresponding to the platforms 261, 261a and 261b, respectively, and continuously moving corridors which again include these platforms and the other portions of the units as before while the platforms are horizontal and aligned in the corresponding groups.

In FIGURES 39 and 40 the frames of the plural platform elevator units are modified each to include a generally S-frame configuration with or without extensions to provide a plurality of platforms in the units. As shown, the frames includes the platforms 361, 361a and 361b appropriately spaced apart and beneath top 362 to afford standing room on each of the platforms for the passengers. Opposed sides 365 and 365a, respectively forming backs for platforms 361 and 361a, rigidly interconnect corresponding ends of platform 361 and top 362 and corresponding opposite ends of platforms 361 and 361a. An extension side 365b in the plane of side 365 interconnects corresponding ends of the platforms 361a and 361b, thus forming a rigid extension of the generally S-configuration of the frame. Again, each elevator unit includes suitable transmissions for opening and closing movable housing portions associated with each of the platforms, the transmission for example being responsive to drive of the units circuitously in the system and accordingly serving to open and close these movable housing portions while the elevator units are traveling through different stations at different general levels and while the platforms of each unit in each of the stations are traveling at different local levels in the station. It is significant, however, that the elevator units (see FIGURE 40) have the passenger space 371 in the intermediate sections of the units opening outwardly in a 180° opposite direction from the passenger spaces 370 and 372. Accordingly, the frame sides 365 and 365b afford backs for the passenger spaces 270 and 272 while the frame side 265a provides a back for the passenger space 371. The movable housing portions corresponding to the passenger space 371, therefore, are adapted to be opened rearwardly in a 180° opposite direction as compared with the corresponding movable housing portions associated with the passenger spaces 370 and 372. A purpose of this arrangement can readily be understood through reference to the fragmentary perspective representation in FIGURE 41 wherein the passenger spaces 370 and 371 now are compiled in continuously movable corridors which are accessible through entrances 375 and 376 at different local levels of the related station wherein platforms 361 and 361a are traveling at low speed and are aligned with each other in their corresponding groups. Entrance 375 gives access to platforms 361 in a 180° opposite direction as compared with direction of access through entrance 376 to platforms 361a at the lower local level. FIGURE 41 does not extend to the still lower local level associated with platforms 361b in the same station; however, these aligned platforms 361b and their associated corridor formed by the units are accessible at the corresponding level in much the same manner as platforms 361 and the corridor corresponding to the latter.

As many possible embodiments of the invention may be made and as many possible changes may be made in the embodiments hereinbefore set forth, it will be distinctly understood that all matter described herein is to be interpreted as illustrative and not as a limitation.

We claim:

1. Transport apparatus comprising a plurality of elevator units each including a rectangular platform, and drive and guide means engaging said elevator units for said platforms to be driven and guided in a horizontal position along an endless path comprising at least two low speed zones situated at different levels, a pair of relatively high speed zones between successive low speed zones, and a varying speed zone connecting each end of each low speed zone with the adjacent end of a relatively high speed zone, said drive and guide means including guide means extending in said low speed zones and engaging said units to guide them for horizontal movement through each said low speed zone with said platforms aligned and closely adjacent each other, said guide means further extending in said relatively high speed zones and engaging said units to guide them for substantially aligned vertical movement through each said relatively high speed zone, and said guide means extending through said varying speed zones connecting said low and relatively high speed zones and engaging said units to guide them for vertical and horizontal movement through each said varying speed zone with the corresponding sides of said platforms maintained substantially parallel to each other and said platforms in stepped relation with difference in elevation of said platforms being at a maximum value at the high speed end of each said varying speed zone and varying progressively to zero at the low speed end thereof, said drive and guide means further including drive means engaging said elevator units for driving said units at low substantially constant speed horizontally through each said low speed zone, drive means for driving said units at relatively high substantially constant speed through each said relatively high speed zone, and drive means for driving said units from one to the other of said low and relatively high speed zones vertically and horizontally through each said varying speed zone at a speed which progressively varies from one of said low and relatively high substantially constant speeds at one end of said varying speed zone to the other of said low and relatively high substantially constant speeds at the other end of said varying speed zone.

2. In varying speed transport apparatus the combination according to claim 1, wherein housings of said units are connected with said platforms each to enclose passenger space having the corresponding said platform for a floor, and each said housing includes a top over the corresponding said platform, a pair of first sides opposing each other breadthwise of said unit adjacent to corresponding opposed first ends of said top and of said platform, and a pair of opposed second sides extending between said pair of opposed first sides and adjacent to opposed second ends of said top and of said platform for said pairs of opposed sides to enclose passenger space covered by said top and having said platform for a floor, at least a portion of said housing, comprising at least one said side, being movably mounted in said unit and movable between open and closed positions relative to said platform for opening and closing said unit to passenger traffic.

3. In varying speed transport apparatus the combination according to claim 2, wherein corresponding said second opposed sides of said housings are immovably fixed to said platforms and are situated in the respective said units for being in alignment with each other as moving wall components while said units are being driven through said first series of positions, and at least said first opposed sides are movably mounted in said units for said units to be opened and closed.

4. In varying speed transport apparatus the combination according to claim 2, wherein both of said second opposed sides of said housings are immovably fixed to the corresponding said platforms and are situated in the respective said units for being in alignment generally in parallel as components of moving walls while said units are being driven through said first series of positions, and said first opposed sides are movably mounted in said units for said units to be opened and closed.

5. In varying speed transport apparatus the combination according to claim 2, wherein said tops of said housings and one each of said second opposed sides interconnecting said tops with said platforms are immovably fixed to the corresponding said platforms and situated in the respective said units for said tops and said one each of said second opposed sides to be in alignment with each other as components of a moving ceiling and wall while said units are being driven through said first series of positions, and the others of said second opposed sides and said first opposed sides are movably mounted in said units for said units to be opened and closed.

6. In varying speed transport apparatus the combination according to claim 2, wherein said portion of said housing is horizontally movable on said platform and said open position thereof is horizontally outward relative to said platform.

7. In varying speed transport apparatus the combination according to claim 2, wherein said portion of said housing is vertically movable on said platform and said open position thereof is vertically downward relative to said platform.

8. In varying speed transport apparatus the combination according to claim 2, wherein said portion of said housing is sequentially horizontally and vertically movable on said platform and said open position thereof is horizontally outward and vertically downward relative to said platform.

9. In varying speed transport apparatus the combination according to claim 2, wherein said second pair of opposed sides are immovably fixed to said platform, and separate unitary portions of said housing each including a portion of said top and portions of said first pair of sides are movably on said platform and are movable with respect to said second pair of sides, between closed and open positions.

10. In varying speed transport apparatus the combination according to claim 2, wherein separate unitary portions of said housing each including a portion of said top and portions of said first pair of sides are horizontally movable on said platform for being moved horizontally outwardly over said second pair of opposed sides between said closed and open positions, and at least one of said unitary portions of said housing and a corresponding one of said second pair of sides being vertically movable on said platform for said unitary portion to be moved downwardly of said platform with said corresponding one of said second pair of sides into said open position.

11. In varying speed transport apparatus the combination according to claim 2, wherein each said elevator unit includes a frame comprising said platform, said top and, for a back, one of said second pair of opposed sides, and the other of said second pair of opposed sides includes two front flexible portions on said elevator unit and each said flexible portion and at least a corresponding forward portion of one of said first opposed pair of sides are movable on said frame and are interconnected for being moved between closed position and a rearward open position.

12. In varying speed transport apparatus the combination according to claim 11, wherein each said flexible portion and corresponding forward and rearward overlapping portions of one of said first opposed pair of sides are movable on said frame and each said flexible portion and corresponding forward portion are interconnected for being moved between closed position and a rearward open position and have means for engaging the corresponding said rearward portion for said rearward portion to be moved between said open and closed positions.

13. In varying speed transport apparatus the combination according to claim 2, wherein each said elevator unit has a frame comprising said top of said unit, said platform of said unit, and one of said second sides of said unit interconnecting the corresponding one of said second ends of said top with the corresponding one of said second ends of said platform of said unit, said frame thus taking a generally C-configuration having therein said platform of said unit.

14. In varying speed transport apparatus, the combination which comprises a plurality of elevator units having similar breadth and each including a plurality of substantially parallel vertically spaced platforms similarly situated in said units and said platforms in each said situation being in a corresponding group, and drive and guide means engaging said elevator units for said units to be driven and guided, said drive and guide means including, guide means extending in a low speed zone and engaging said units to guide said units for being driven at low speed breadthwise through a first series of positions in said low speed zone and for said platforms in each of said groups in said first series of positions to be aligned with each other in said group and substantially horizontal and said units in said first series of positions to have midpoints of said breadths thereof spaced apart a distance from unit to unit amounting to about said breadth, said guide means further extending in a relatively high speed zone and engaging said units to guide said units for being driven at relatively high speed in an elevated relation through a second series of positions in said relatively high speed zone and for said platforms in said second series of positions to be substantially horizontal and at different elevations, and said guide means extending through a varying speed zone between said low and relatively high speed zones and engaging said units to guide said units for being driven from one of said first and second series of positions to the other of said first and second series of positions vertically and breadthwise through a third series of positions in said varying speed zone at varying speed progressively increasing from said low speed at the low speed end of said varying speed zone to said relatively high speed at the high speed end of said varying speed zone and for said units in said third series of positions to have their axes transverse to said breadths thereof substantially parallel and said platforms thereof within each said group substantially horizontal in stepped relation between said low and relatively high speed zones with difference in elevation of said platforms of said group being major adjacent to the high speed end of said varying speed zone and varying to difference in elevation of said platforms of said group being minor adjacent to the low speed end of said varying speed zone, and said drive and guide means further including drive means engaging said elevator units for driving said units at said low speed breadthwise through said first series of positions while said platforms within each said group in said first series of positions are substantially horizontal in alignment with each other and said units in said first series of positions have said midpoints of said breadths thereof spaced apart a distance from unit to unit amounting to about said breadths, for driving said units at said relatively high speed through said second series of positions while said platforms in said second series of positions are at different elevations and substantially horizontal, and for driving said units transversely of said axes from one of said first and second series of positions to the other of said first and second series of positions vertically and breadthwise through said third series of positions at varying speed progressively increasing from said low speed at the low speed end of said varying speed zone to said relatively high speed at the high speed end of said varying speed zone while said units in said third series of positions have said axes thereof substantially parallel and said platforms thereof within each said group substantially horizontal in stepped relation between said low and relatively high speed zones with major difference in elevation of said platforms in said group being major adjacent to the high speed end of said varying speed zone and varying to difference in elevation of said platforms in said group being minor adjacent to the low speed end of said varying speed zone.

15. In varying speed transport apparatus the combination according to claim 14, wherein said guide means extends guidingly through a station introducing a plurality of loading and unloading landings at different local levels corresponding in number to the number of said platforms in each of said elevator units, and said guide means extends substantially horizontally rectilinearly adjacent to the loading and unloading landings at the station for said platforms to be moved in common planes at the landings in the station.

16. In varying speed transport apparatus the combination according to claim 14, wherein each said elevator unit has a frame comprising a top of said unit, at least two said platforms of said unit, and a breadthwise side of said unit interconnecting an end of said top with corresponding ends of said two platforms of said unit, said frame thus taking a generally E-configuration.

17. In varying speed transport apparatus the combination according to claim 14, wherein each said elevator unit has a frame comprising a top of said unit, at least two said platforms of said unit, and opposed breadthwise sides of said unit respectively interconnecting an end of one of said two platforms of said unit with a corresponding end of said top and an opposite end of said one of said two platforms of said unit with a corresponding end of the next of said two platforms of said unit, said frame thus taking a generally S-configuration.

18. In varying speed transport apparatus, the combination which comprises a succession of elevator units having similar breadth and each including a platform having substantially the same breadth as said unit, and each said unit further comprising a passenger enclosure connected with said platform and extending above the perimeter of said platform, at least a portion of said enclosure being movably mounted in said unit for being moved with respect to said platform between open and closed positions to open and close said unit; and drive and control means engaging said elevator units for said units to be driven and guided and for said units to be opened and closed, said drive and control means including, guide means extending in a low speed zone and engaging said units to guide said units for being driven at low speed breadthwise through a first series of positions in said low speed zone and for said platforms in said first series of positions to be substantially horizontal and aligned breadthwise with each other and have midpoints of said breadths thereof spaced apart from unit to unit a distance amounting to about said breadth of said platform, said guide means further extending in a relatively high speed zone and engaging said units to guide said units for being driven at relatively high speed in an elevated relation through a second series of positions in said relatively high speed zone and for said platforms in said second series of positions to be substantially horizontal and at different elevations, and said guide means extending through a varying speed zone between said low and relatively high speed zones and engaging said units to guide said units for being driven from one of said first and second series of positions to the other of said first and second series of positions vertically and breadthwise through a third series of positions in said varying speed zone at varying speed progressively increasing from said low speed at the low speed end of said varying speed zone to said relatively high speed at the high speed end of said varying speed zone and for said units in said third series of positions to have their axes transverse to said breadths thereof substantially parallel and said platforms thereof substantially horizontal in stepped relation between said low and relatively high speed zones with difference in elevation of said platforms being major adjacent to the high speed end of said varying speed zone and varying to difference in elevation of said platforms being minor adjacent to the low speed end of said varying speed zone, and said drive and control means further including drive means engaging said elevator units for driving said units at said low speed breadthwise through said first series of positions while said platforms in said first series of positions are substantially horizontal in alignment with each other and have midpoints of said breadths thereof spaced apart from unit to unit a distance amounting to about said breadth of said platform, for driving said units at said relatively high speed through said second series of positions while said platforms in said second series of positions are at different elevations and substantially horizontal, and for driving said units transversely of said axes from one of said first and second series of positions to the other of said first and second series of positions vertically and breadthwise through said third series of positions at varying speed progressively increasing from said low speed at the low speed end of said varying speed zone to said relatively high speed at the high speed end of said varying speed zone while said units in said third series of positions have said axes thereof substantially parallel and said platforms thereof substantially horizontal in stepped relation between said low and relatively high speed zones with difference in elevation of said platforms being major adjacent to the high speed end of said varying speed zone and varying to difference in elevation of said platforms being minor adjacent to the low speed end of said varying speed zone, and position control means operably associated with said passenger enclosures of said units for said passenger enclosures of said units to open and close said units in said low speed zone while said units are moving through said first series of positions.

19. In varying speed transport apparatus the combination according to claim 18, wherein said position control means includes means for a plurality of said passenger enclosures correspondingly in sequential ones of said units to remain simultaneously open before closing while said units are being driven in direction of said breadths thereof through said first series of positions in said low speed zone.

20. In varying speed transport apparatus the combination according to claim 18 wherein said control means includes means for a plurality of said passenger enclosures correspondingly in adjacent ones of said units to remain simultaneously open before closing while said units are being driven at said low speed in direction of said breadth thereof through said first series of positions in said low speed zone, and said passenger enclosure of each said unit includes sides mounted to be moved transversely of said breadth of said unit for said unit to be open and closed breadthwise, and said passenger enclosure being operably associated with said position control means for said sides in corresponding sequential ones of said units being driven through said first series of positions to move transversely of said breadths of said sequential units into a simultaneously open relation thus maintaining said sequential units open to each other breadthwise before said units close.

21. In varying speed transport apparatus the combination according to claim 18, wherein said control means includes means for a plurality of said passenger enclosures correspondingly in sequential ones of said units to remain simultaneously open before closing while said units are being driven at said low speed in direction of said breadths thereof through said first series of positions, and said passenger enclosure of each said unit includes a pair of spaced opposed first sides extending transversely to direction of said breadth of said unit adjacent to corresponding opposed first ends of said platform, and a second side of said passenger enclosure closing off said first pair of opposed sides adjacent to a corresponding second end of said platform, and said sides of said passenger enclosure being movably mounted in said unit and operably mounted with said position control means for said sides, in corresponding sequential ones of said units being driven through said first series of positions, to maintain said sequential units simultaneously open transversely of said direction of said breadths thereof and simultaneously open to each other breadthwise before closing.

22. In varying speed transport apparatus the combination according to claim 1, wherein said guide means extends guidingly through at least two stations in different vertically spaced locations and loading and unloading landings in the stations for said elevator units to be moved from station to station, and wherein said guide means extends substantially horizontally rectilinearly adjacent to the loading and unloading landings at the stations for said platforms to be moved through a corresponding said first series of positions at each of the landings and thus serve the landings.

23. Varying speed transport apparatus according to claim 1, wherein said guide means has up and down transport sides and extends substantially horizontally rectilinearly from one end to the other of at least one of said low speed zones and between a corresponding two of said varying speed zones respectively on said up and down transport sides, for maintaining said platforms in a corresponding one of said first series of positions throughout the distance between ends of said two intermediate varying speed zones.

24. Varying speed transport apparatus according to claim 23, wherein said guide means crosses in leading to and from said two varying speed zones on said up and down transport sides, for establishing direction of guided movement of said platforms through said low speed zone between said two varying speed zones.

25. Varying speed transport apparatus according to claim 1, wherein said guide means has up and down transport sides and extends from one end to the other of at least one of said low speed zones and substantially horizontally rectilinearly outwardly away in two different locations in said low speed zone from two of said varying speed zones respectively on said up and down transport sides, for maintaining said platforms in a corresponding said first series of positions in each of said locations, said circuitous guide means effecting curves between said locations and thus curving through other levels from one of said locations and back to the other of said locations.

26. Varying speed elevator apparatus according to claim 1, wherein said guide means has up and down transport sides for extending at least on one of said transport sides sequentially through one of said high speed zones and then one of said varying speed zones, thence substantially horizontally rectilinearly from one end to the other of one of said low speed zones, and thence through another of said intermediate varying speed zones and then through another of said high speed zones.

27. Varying speed transport apparatus according to claim 1, wherein said guide means has up and down transport sides and extends through at least two said relatively high speed zones of the apparatus for said elevator units to be moved downwardly and upwardly respectively through one and the other of said relatively high speed zones at said relatively high speed, and wherein said drive means includes thrust and endless carrier means for moving said elevator units, said thrust and endless carrier means including endless carrier means extending through said two relatively high speed zones and engaging said elevator units in corresponding series relations along said down and up transport sides of said circuitous guide means for said units in said two relatively high speed zones to counterbalance while being driven at said relatively high speed downwardly and upwardly respectively through one and the other of said two relatively high speed zones, and thrust means for said units to be driven in circuitous direction in said relations thereof in said zones of the apparatus and through said zones at said speeds corresponding to said zones.

28. In varying speed transport apparatus the combination according to claim 1, wherein said guide means has up and down sides extending between corresponding said high speed zones between the two stations and has a helical guide surface for turning said elevator units vertically axially into horizontally end for end re-oriented positions in response to said units being driven by said drive means from either of the loading and unloading landings of the two stations to the other of the loading and unloading landings of the two stations.

References Cited

UNITED STATES PATENTS

| | | | |
|---|---|---|---|
| 81,677 | 9/1868 | Pearce | 104—183 |
| 815,834 | 3/1906 | Hutchinson | 104—25 |
| 1,632,569 | 6/1927 | Taylor | 104—25 |
| 2,802,427 | 8/1957 | Da Costa | 104—18 |
| 2,862,577 | 12/1958 | Deverell | 187—44 |
| 2,905,100 | 9/1959 | Kendall et al. | 104—25 |
| 3,238,893 | 3/1966 | Zuppiger | 104—24 |

ARTHUR L. LA POINT, *Primary Examiner.*

DRAYTON E. HOFFMAN, *Examiner.*

Dedication 3,352,250.—*Gabriel Bouladon*, Versoix, Geneva, and *Paul Zuppiger*, Carouge, Geneva, Switzerland. TRANSPORT APPARATUS. Patent dated Nov. 14, 1967. Dedication filed Sept. 11, 1975, by the assignee, *The Battelle Development Corporation*.

Hereby dedicates to the People of the United States the entire remaining term of said patent.

[*Official Gazette November 11, 1975.*]